(12) United States Patent
Okumura et al.

(10) Patent No.: US 10,193,434 B2
(45) Date of Patent: Jan. 29, 2019

(54) POWER CONVERSION DEVICE AND THREE-PHASE AC POWER SUPPLY DEVICE

(71) Applicant: Sumitomo Electric Industries, Ltd., Osaka-shi (JP)

(72) Inventors: Toshiaki Okumura, Osaka (JP); Naoki Ayai, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/319,715

(22) PCT Filed: Mar. 10, 2015

(86) PCT No.: PCT/JP2015/057036
§ 371 (c)(1),
(2) Date: Dec. 16, 2016

(87) PCT Pub. No.: WO2016/006273
PCT Pub. Date: Jan. 14, 2016

(65) Prior Publication Data
US 2017/0133921 A1    May 11, 2017

(30) Foreign Application Priority Data
Jul. 8, 2014 (JP) .................................. 2014-140750

(51) Int. Cl.
*H02M 1/12* (2006.01)
*H02M 7/537* (2006.01)
(Continued)

(52) U.S. Cl.
CPC .............. *H02M 1/126* (2013.01); *G05F 1/67* (2013.01); *H02M 1/12* (2013.01); *H02M 7/49* (2013.01);
(Continued)

(58) Field of Classification Search
USPC ........................................................ 307/52
See application file for complete search history.

(56) References Cited

U.S. PATENT DOCUMENTS

2010/0237704 A1    9/2010  Nakajima et al.
2011/0063883 A1    3/2011  Hattori et al.
(Continued)

FOREIGN PATENT DOCUMENTS

CN    102099996 A    6/2011
CN    103283135 A    9/2013
(Continued)

OTHER PUBLICATIONS

International Search Report in counterpart International Application No. PCT/JP2015/057036, dated Jun. 16, 2015.

*Primary Examiner* — Rexford Barnie
*Assistant Examiner* — Xuan Ly
(74) *Attorney, Agent, or Firm* — Venable LLP; Michael A. Sartori; Laura G. Remus

(57) ABSTRACT

This power conversion device includes: conversion devices for supplying AC powers to respective phases with respect to the neutral point of a three-phase AC system via reactors; and a control unit for controlling the conversion devices. Each conversion device includes: a step-up circuit for stepping up the DC input voltage value of DC power; and a single-phase inverter circuit. For each conversion device, when the absolute value of a voltage target value obtained, as an AC waveform to be outputted, by superimposing a third-order harmonic on a fundamental wave exceeds the inputted DC voltage, the control unit causes the step-up circuit to perform step-up operation to generate the absolute value of the voltage target value and causes the single-phase inverter circuit to only perform necessary polarity inversion, and when the absolute value of the voltage target value is smaller than the inputted DC voltage, the control unit stops the step-up operation of the step-up circuit and causes the single-phase inverter circuit to operate to generate the voltage target value.

19 Claims, 23 Drawing Sheets

(51) Int. Cl.
*G05F 1/67* (2006.01)
*H02M 7/49* (2007.01)
*H02M 3/158* (2006.01)
*H02J 3/38* (2006.01)
*H02M 1/00* (2006.01)

(52) U.S. Cl.
CPC ............ *H02M 7/537* (2013.01); *H02J 3/383* (2013.01); *H02M 3/158* (2013.01); *H02M 2001/007* (2013.01)

(56) References Cited

U.S. PATENT DOCUMENTS

2011/0080147 A1* 4/2011 Schoenlinner .......... H02M 7/48 323/282
2013/0264984 A1 10/2013 Tamura et al.

FOREIGN PATENT DOCUMENTS

| EP | 2219276 A1 | | 8/2010 |
|----|------------|---|--------|
| JP | 8-44446 | * | 2/1996 |
| JP | 08-44446 A | | 2/1996 |
| JP | 2000-152651 | * | 5/2000 |
| JP | 2000-152651 A | | 5/2000 |
| JP | 2002-270884 | * | 9/2002 |
| JP | 2002-270884 A | | 9/2002 |
| JP | 2002-369544 A | | 12/2002 |
| JP | 2010-226843 A | | 10/2010 |
| JP | 2011-078306 A | | 4/2011 |
| JP | 2012-137830 A | | 7/2012 |
| JP | 2013-215093 | * | 10/2013 |
| JP | 2013-215093 A | | 10/2013 |
| JP | 2014-090563 | * | 5/2014 |
| JP | 2014-90563 | * | 5/2014 |
| JP | 2014-090563 A | | 5/2014 |
| WO | 2013/069326 A1 | | 5/2013 |

\* cited by examiner

POWER CONVERSION DEVICE AND THREE-PHASE AC POWER SUPPLY DEVICE

TECHNICAL FIELD

The present invention relates to a three-phase AC power supply device that generates AC power from DC power and performs system interconnection with a three-phase AC system, and to a power conversion device used for the three-phase AC power supply device.

BACKGROUND ART

For example, power generated as DC current by a photovoltaic panel can be system-interconnected with a commercial AC system via a power conditioner which is a power conversion device. The system interconnection can be performed for not only a single-phase AC system but also a three-phase AC system (for example, see Patent Literature 1 (FIG. 2)).

FIG. 23 is an example of a circuit diagram of a power conversion device used in a case of performing system interconnection from a DC power supply to a three-phase AC system. In FIG. 23, a power conversion device 200 generates AC power based on DC received from a photovoltaic panel 201 as a DC power supply, and supplies the power to a three-phase AC system 220. The power conversion device 200 includes a capacitor 202, a step-up circuit 203, a smoothing circuit 205 for smoothing the voltage of a DC bus 204, a three-phase inverter circuit 207, and three pairs of AC reactors 208 to 210 and capacitors 211 to 213. The smoothing circuit 205 is formed by connecting two capacitors 206 in series for the purpose of obtaining the withstand voltage property and connecting six sets of such two capacitors 206 in parallel for the purpose of obtaining the capacitance. The capacitance of the smoothing circuit as a whole is several mF, for example.

In this example, the photovoltaic panels 201, the capacitors 202, and the step-up circuits 203 are provided for three systems, and these systems are connected in parallel to the DC bus 204. For example, if input voltage from one photovoltaic panel 201 is DC 200V and the current thereof is 30 A, power of 6 kW per system and power of 18 kW in total can be generated. The line-to-line voltage of the three-phase AC system 220 is 400V.

For the output of the photovoltaic panel 201, the step-up circuit 203 performs maximum power point tracking (MPPT) control to obtain an optimum operating point. The output of the step-up circuit 203 is smoothed by the smoothing circuit 205 having a large capacitance, to become the voltage of the DC bus 204. This voltage is subjected to switching by the three-phase inverter circuit 207, thereby generating three-phase AC voltage including a high-frequency component. The high-frequency component is removed by the AC reactors 208 to 210 and the capacitors 211 to 213, whereby a waveform that allows system interconnection with the three-phase AC system 220 is obtained.

Here, the voltage of the DC bus 204 is required to be equal to or higher than the wave crest value of AC 400V (effective value), which is 400×√2, i.e., about 566V, but is set at 600V, considering some margin. In a case where the voltage of the DC bus 204 is 600V, when a switching element in the three-phase inverter circuit 207 is turned off, due to resonance by a floating inductance and the capacitance of the switching element, voltage that greatly exceeds 600V is applied to the switching element. Therefore, in order to reliably prevent insulation breakdown of the switching element, for example, withstand voltage property of 1200V which is twice as high as the voltage of the DC bus is required. In addition, the withstand voltage property of 1200V is also required for the smoothing circuit 205, and in the configuration in FIG. 23, withstand voltage property of 600V is required for each capacitor.

CITATION LIST

Patent Literature

PATENT LITERATURE 1: Japanese Laid-Open Patent Publication No. 2012-137830

SUMMARY OF INVENTION

Technical Problem

In the conventional power conversion device as described above, further improvement in the conversion efficiency is required. In order to improve the conversion efficiency, it is effective to reduce switching loss. In general, the higher the voltage of the DC bus is, the greater the switching loss and the like are. Therefore, how to reduce the voltage of the DC bus is a problem. In addition, it is desired to reduce the switching loss and other power losses also by means other than the reduction in the voltage.

In view of the above problems, a main object of the present invention is to reduce power loss due to conversion in a power conversion device used for system interconnection to a three-phase AC system.

Solution to Problem

The present invention provides a power conversion device for converting DC powers to AC powers to be supplied to a three-phase AC system, the DC powers being inputted from a first DC power supply, a second DC power supply, and a third DC power supply which are independent of each other without sharing either a positive terminal or a negative terminal, the power conversion device including: a first-phase conversion device configured to, based on the DC power inputted from the first DC power supply, supply the AC power to a first phase with respect to a neutral point of the three-phase AC system via a first reactor; a second-phase conversion device configured to, based on the DC power inputted from the second DC power supply, supply the AC power to a second phase with respect to the neutral point of the three-phase AC system via a second reactor; a third-phase conversion device configured to, based on the DC power inputted from the third DC power supply, supply the AC power to a third phase with respect to the neutral point of the three-phase AC system via a third reactor; and a control unit configured to control the first-phase conversion device, the second-phase conversion device, and the third-phase conversion device.

The first-phase conversion device, the second-phase conversion device, and the third-phase conversion device each include a step-up circuit for stepping up a DC input voltage value of the DC power, and a single-phase inverter circuit. For each of the first-phase conversion device, the second-phase conversion device, and the third-phase conversion device, when an absolute value of a voltage target value obtained, as an AC waveform to be outputted, by superimposing a third-order harmonic on a fundamental wave exceeds the inputted DC voltage, the control unit causes the step-up circuit to perform step-up operation to generate the absolute value of the voltage target value and causes the single-phase inverter circuit to only perform necessary polarity inversion, and when the absolute value of the voltage target value is smaller than the inputted DC voltage, the control unit stops the step-up operation of the step-up circuit and causes the single-phase inverter circuit to operate to generate the voltage target value.

In addition, the present invention provides a three-phase AC power supply device connected to a three-phase AC system, the three-phase AC power supply device including: a first DC power supply, a second DC power supply, and a third DC power supply which are independent of each other without sharing either a positive terminal or a negative terminal; a first-phase conversion device configured to, based on DC power inputted from the first DC power supply, supply AC power to a first phase with respect to a neutral point of the three-phase AC system via a first reactor; a second-phase conversion device configured to, based on DC power inputted from the second DC power supply, supply AC power to a second phase with respect to the neutral point of the three-phase AC system via a second reactor; a third-phase conversion device configured to, based on DC power inputted from the third DC power supply, supply AC power to a third phase with respect to the neutral point of the three-phase AC system via a third reactor; and a control unit configured to control the first-phase conversion device, the second-phase conversion device, and the third-phase conversion device.

The first-phase conversion device, the second-phase conversion device, and the third-phase conversion device each include a step-up circuit for stepping up a DC input voltage value of the DC power, and a single-phase inverter circuit. For each of the first-phase conversion device, the second-phase conversion device, and the third-phase conversion device, when an absolute value of a voltage target value obtained, as an AC waveform to be outputted, by superimposing a third-order harmonic on a fundamental wave exceeds the inputted DC voltage, the control unit causes the step-up circuit to perform step-up operation to generate the absolute value of the voltage target value and causes the single-phase inverter circuit to only perform necessary polarity inversion, and when the absolute value of the voltage target value is smaller than the inputted DC voltage, the control unit stops the step-up operation of the step-up circuit and causes the single-phase inverter circuit to operate to generate the voltage target value.

Advantageous Effects of Invention

The power conversion device and the three-phase AC power supply device of the present invention enable reduction in power loss due to conversion.

DESCRIPTION OF EMBODIMENTS

[Summary of Embodiments]

Figure 1:
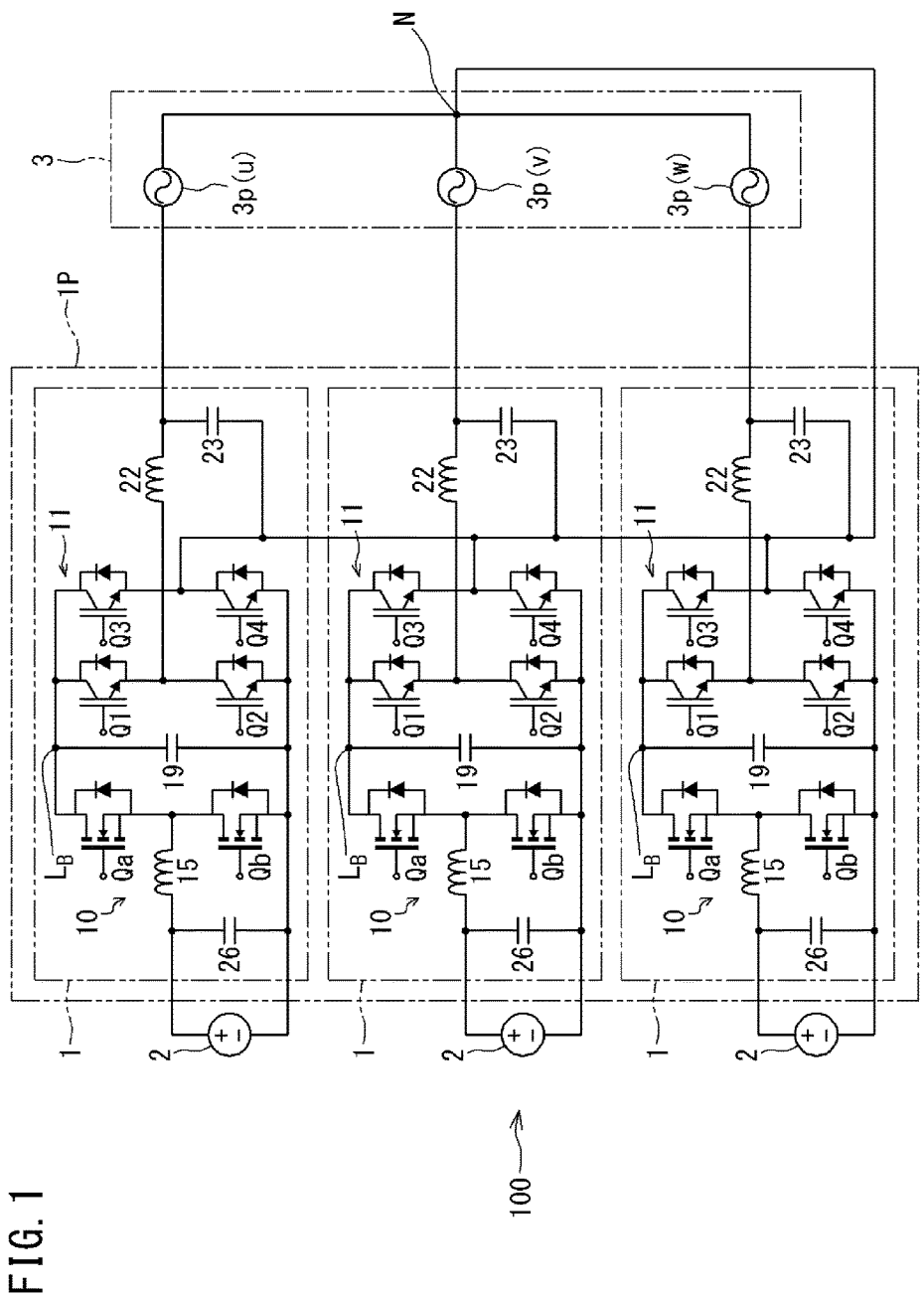
FIG. 1 is a circuit diagram showing a three-phase AC power supply device connected to a three-phase AC system.

Summary of the embodiments of the present invention includes at least the following.

(1) This provides a power conversion device for converting DC powers to AC powers to be supplied to a three-phase AC system, the DC powers being inputted from a first DC power supply, a second DC power supply, and a third DC power supply which are independent of each other without sharing either a positive terminal or a negative terminal, the power conversion device including: a first-phase conversion device configured to, based on the DC power inputted from the first DC power supply, supply the AC power to a first phase with respect to a neutral point of the three-phase AC system via a first reactor; a second-phase conversion device configured to, based on the DC power inputted from the second DC power supply, supply the AC power to a second phase with respect to the neutral point of the three-phase AC system via a second reactor; a third-phase conversion device configured to, based on the DC power inputted from the third DC power supply, supply the AC power to a third phase with respect to the neutral point of the three-phase AC system via a third reactor; and a control unit configured to control the first-phase conversion device, the second-phase conversion device, and the third-phase conversion device.

The first-phase conversion device, the second-phase conversion device, and the third-phase conversion device each include a step-up circuit for stepping up a DC input voltage value of the DC power, and a single-phase inverter circuit. For each of the first-phase conversion device, the second-phase conversion device, and the third-phase conversion device, when an absolute value of a voltage target value obtained, as an AC waveform to be outputted, by superimposing a third-order harmonic on a fundamental wave exceeds the inputted DC voltage, the control unit causes the step-up circuit to perform step-up operation to generate the absolute value of the voltage target value and causes the single-phase inverter circuit to only perform necessary polarity inversion, and when the absolute value of the voltage target value is smaller than the inputted DC voltage, the control unit stops the step-up operation of the step-up circuit and causes the single-phase inverter circuit to operate to generate the voltage target value.

In the power conversion device configured as described above, since the (first, second, third) conversion devices are provided for the respective phases and configured to output phase voltages, the voltage $V_{AC}$ (effective value) that each conversion device should output is $(1/\sqrt{3})$ of the system voltage of the three-phase AC system. Each conversion device performs the following operation.

(i) When the absolute value of the voltage target value exceeds inputted DC voltage,
the step-up circuit performs operation, and
the single-phase inverter circuit stops high-frequency switching and only performs necessary polarity inversion.

(ii) When the absolute value of the instantaneous value of the voltage target value is smaller than inputted DC voltage,
the step-up circuit is stopped (in FIG. 2, Qa is ON, Qb is OFF), and
the single-phase inverter circuit performs operation.

That is, the step-up circuit and the single-phase inverter circuit alternately perform high-frequency switching such that, when one of them performs high-frequency switching, the other one stops high-frequency switching. In this case, the peak value $V_B$ of voltage of the DC bus only needs to be the wave crest value of the voltage $V_{AC}$, i.e., $V_B = \sqrt{2} \cdot V_{AC}$.

As a result, the voltage of the DC bus is reduced as compared to a case of supplying system voltage (line-to-line voltage) by a single three-phase inverter. In addition, owing to the effect of reducing the wave crest value by superimposition of the third-order harmonic, the voltage of the DC bus is further reduced.

Voltage reduction in the DC bus provides the following advantages.

(a) Switching loss in the switching elements is reduced.
(b) Iron loss in the (DC, AC (first, second, third)) reactors is reduced.
(c) For the switching elements and the smoothing capacitor connected to the DC bus, even the ones having low withstand voltage properties can be used. Since a switching element having a lower withstand voltage property has a lower ON resistance, conduction loss can be reduced.

The alternate operations in the above (i) and (ii) provide the following advantages.

(d) The number of times the switching elements perform switching is reduced as a whole, and accordingly, switching loss is greatly reduced.
(e) Iron loss in the (DC, AC) reactors is reduced.
(f) The capacitor is not required to have a function of smoothing a low-frequency AC component that is three times as high as the system frequency, and therefore a capacitor with a low capacitance can be used.

(2) In the power conversion device of (1), preferably, the control unit calculates an output current target value based on an input power value of the DC power and a voltage value of each phase of the three-phase AC system, and calculates a current target value and a voltage target value for the single-phase inverter circuit based on the output current target value, to control the single-phase inverter circuit; also calculates a current target value for the step-up circuit based on a current target value and a voltage target value that are common with the single-phase inverter circuit, and on the DC input voltage value, to control the step-up circuit; and thereby controls output of the AC power.

In a case of the above (2), the power conversion device can constantly provide output based on the current target value and the voltage target value for the single-phase inverter circuit, to each reactor. The control unit determines target values on the power conversion device side without directly depending on a voltage value of the three-phase AC system, and can cause the step-up circuit and the single-phase inverter circuit to perform desired operations, based on the target values. Therefore, the control unit can control each conversion device to output AC power having a voltage phase leading the voltage phase of phase voltage of the three-phase AC system by several degrees.

That is, since the voltage phase of AC power outputted from each conversion device is caused to lead the voltage phase of the three-phase AC system by several degrees, the phase of voltage between both ends of each (first, second, third) reactor can be caused to lead the voltage phase of the three-phase AC system by almost 90 degrees. Since the current phase of each reactor lags the voltage phase thereof by 90 degrees, the current phase of AC power outputted through the reactor is almost synchronized with the phase of phase voltage of the three-phase AC system.

As a result, AC power having almost the same current phase as each phase voltage of the three-phase AC system can be outputted, whereby reduction in a power factor of the AC power can be suppressed.

The power conversion device of the above (2) may have specific features recited in the following (3) to (10), for example.

(3) For example, in the power conversion device of the above (2), a smoothing capacitor may be provided between the step-up circuit and the single-phase inverter circuit, and the current target value for the step-up circuit may be calculated based on the DC input voltage value and on a value obtained by adding reactive power passing through the smoothing capacitor to a power target value that is based on the current target value and the voltage target value for the single-phase inverter circuit.

In this case, it is possible to determine the current target value for the step-up circuit more accurately in consideration of reactive power as well as the power target value for the single-phase inverter circuit.

(4) In the power conversion device of the above (2), a smoothing capacitor may be provided between the step-up circuit and the single-phase inverter circuit, and the current target value for the step-up circuit may be calculated based on the DC input voltage value and on a value obtained by adding reactive power passing through the smoothing capacitor and power loss in the power conversion device to a power target value that is based on the current target value and the voltage target value for the single-phase inverter circuit.

In this case, it is possible to determine the current target value for the step-up circuit more strictly in consideration of reactive power and power loss as well as the power target value for the inverter circuit.

(5) In the power conversion device of the above (2), for example, an output smoothing capacitor may be provided at a stage subsequent to each of the first reactor, the second reactor, and the third reactor, and in a case where the output current target value is Ia*, the current target value for the step-up circuit is Iin*, the current target value and the voltage target value for the single-phase inverter circuit are Iinv* and Vinv*, respectively, an electrostatic capacitance of the output smoothing capacitor is Ca, the voltage value of each phase of the three-phase AC system is Va, and the DC input voltage value is Vg, the following expressions may be satisfied:

$$Iin^* = (Iinv^* \times Vinv^*)/Vg$$

$$Iinv^* = Ia^* + Ca \times (dVa/dt).$$

In this case, it is possible to determine the current target value for the single-phase inverter circuit and the current target value for the step-up circuit in consideration of current flowing through the output smoothing capacitor.

(6) In the power conversion device of the above (2), for example, an output smoothing capacitor may be provided at a stage subsequent to each of the first reactor, the second reactor, and the third reactor, and in a case where the output current target value is Ia*, the current target value for the step-up circuit is Iin*, the current target value and the voltage target value for the single-phase inverter circuit are Iinv* and Vinv*, respectively, the voltage value of each phase of the three-phase AC system is Va, the DC input voltage value is Vg, and current flowing through the output smoothing capacitor is Ica, the following expressions may be satisfied:

$$Iin^* = (Iinv^* \times Vinv^*)/Vg$$

$$Iinv^* = Ia^* + Ica.$$

In this case, it is possible to determine the current target value for the single-phase inverter circuit and the current target value for the step-up circuit in consideration of current flowing through the output smoothing capacitor.

(7) In the power conversion device of the above (3), for example, in a case where the current target value for the step-up circuit is Iin*, the current target value and the voltage target value for the single-phase inverter circuit are Iinv* and Vinv*, respectively, an electrostatic capacitance of the smoothing capacitor is C, a voltage target value for the step-up circuit is Vo*, and the DC input voltage value is Vg, the following expression may be satisfied:

$$Iin^* = \{(Iinv^* \times Vinv^*) + C \times (dVo^*/dt) \times Vo^*\}/Vg.$$

(8) In the power conversion device of the above (3), for example, in a case where the current target value for the step-up circuit is Iin*, the current target value and the voltage target value for the single-phase inverter circuit are Iinv* and Vinv*, respectively, a voltage target value for the step-up circuit is Vo*, the DC input voltage value is Vg, and current flowing through the smoothing capacitor is Ic, the following expression may be satisfied:

$$Iin^* = \{(Iinv^* \times Vinv^*) + Ic \times Vo^*\}/Vg.$$

(9) In the power conversion device of the above (4), for example, in a case where the current target value for the step-up circuit is Iin*, the current target value and the voltage target value for the single-phase inverter circuit are Iinv* and Vinv*, respectively, an electrostatic capacitance of the smoothing capacitor is C, a voltage target value for the step-up circuit is Vo*, the DC input voltage value is Vg, and power loss in the power conversion device is $P_{LOSS}$, the following expression may be satisfied:

$$Iin^* = \{(Iinv^* \times Vinv^*) + C \times (dVo^*/dt) \times Vo^* + P_{LOSS}\}/Vg.$$

(10) In the power conversion device of the above (4), for example, in a case where the current target value for the step-up circuit is Iin*, the current target value and the voltage target value for the single-phase inverter circuit are Iinv* and Vinv*, respectively, a voltage target value for the step-up circuit is Vo*, the DC input voltage value is Vg, current flowing through the smoothing capacitor is Ic, and power loss in the power conversion device is $P_{LOSS}$, the following expression may be satisfied:

$$Iin^* = \{(Iinv^* \times Vinv^*) + Ic \times Vo^* + P_{LOSS}\}/Vg.$$

(11) In the power conversion device of any one of the above (5) to (10), the control unit may calculate the voltage target value Vinv* for the single-phase inverter circuit as the voltage target value for the step-up circuit by the following expression:

$$Vinv^* = Va + La(dIinv^*/dt).$$

Here, La is an inductance that is common among the first reactor, the second reactor, and the third reactor.

In this case, since both the step-up circuit and the single-phase inverter circuit operate based on the current target value Iinv* set by the control unit, occurrence of phase-deviation or distortion in AC current outputted from each conversion device can be suppressed even if operation is performed so as to alternately switch the high-frequency switching period between the two circuits.

(12) In the power conversion device of any one of the above (1) to (11), power may be received from the three-phase AC system and DC power may be outputted to the first DC power supply, the second DC power supply, and the third DC power supply. That is, if the phase of the current target value (Iinv*) and the phase of the voltage target value (Vinv*) for the single-phase inverter circuit are shifted from each other by 180 degrees, it is also possible to perform output in a reverse direction from the three-phase AC system to each DC power supply, through the same control of the current target value (Iin*).

(13) In another aspect, this provides a three-phase AC power supply device connected to a three-phase AC system, the three-phase AC power supply device including: a first DC power supply, a second DC power supply, and a third DC power supply which are independent of each other without sharing either a positive terminal or a negative terminal; a first-phase conversion device configured to, based on DC power inputted from the first DC power supply, supply AC power to a first phase with respect to a neutral point of the three-phase AC system via a first reactor; a second-phase conversion device configured to, based on DC power inputted from the second DC power supply, supply AC power to a second phase with respect to the neutral point of the three-phase AC system via a second reactor; a third-phase conversion device configured to, based on DC power inputted from the third DC power supply, supply AC power to a third phase with respect to the neutral point of the three-phase AC system via a third reactor; and a control unit configured to control the first-phase conversion device, the second-phase conversion device, and the third-phase conversion device.

The first-phase conversion device, the second-phase conversion device, and the third-phase conversion device each include a step-up circuit for stepping up a DC input voltage value of the DC power, and a single-phase inverter circuit. For each of the first-phase conversion device, the second-phase conversion device, and the third-phase conversion device, when an absolute value of a voltage target value obtained, as an AC waveform to be outputted, by superimposing a third-order harmonic on a fundamental wave exceeds the inputted DC voltage, the control unit causes the step-up circuit to perform step-up operation to generate the absolute value of the voltage target value and causes the single-phase inverter circuit to only perform necessary polarity inversion, and when the absolute value of the voltage target value is smaller than the inputted DC voltage, the control unit stops the step-up operation of the step-up circuit and causes the single-phase inverter circuit to operate to generate the voltage target value.

The above three-phase AC power supply device provides the same effect as that of the power conversion device of (1).

(14) In the three-phase AC power supply device of (13), each of the first DC power supply, the second DC power supply, and the third DC power supply may be a concentrator photovoltaic panel configured to operate so as to track the sun.

In this case, it is possible to perform comparatively stable power generation with high output during the day while suppressing power loss.

[DETAILS OF EMBODIMENTS]

Hereinafter, embodiments of the present invention will be described in detail with reference to the drawings. In the present specification and the drawings, although a term of "command value" and a term of "target value" coexist, they are the same meaning as each other.

<<Configuration as Three-Phase AC Power Supply Device>>

FIG. 1 is a circuit diagram showing a three-phase AC power supply device 100 connected to a three-phase AC system 3. The three-phase AC power supply device 100 includes a power conversion device 1P, and, for example, three photovoltaic panels 2 as a DC power supply (first DC power supply, second DC power supply, third DC power supply). The three photovoltaic panels 2 are in such a relation as to be independent of each other without sharing either the positive terminals or the negative terminals.

The power conversion device 1P is composed of three conversion devices (first-phase conversion device, second-phase conversion device, third-phase conversion device) 1 provided for the respective phases of the three-phase AC. The conversion device 1 converts DC power inputted from the photovoltaic panel 2, to AC power, and supplies the AC power to the three-phase AC system 3. The three conversion devices 1 supply AC powers with the respective phase voltages, to the respective phases $3p$ (first phase u, second phase v, third phase w) with respect to a neutral point N of the three-phase AC system 3.

In a case where the line-to-line voltage of the three-phase AC system 3 is 400V, the phase voltage is about 231V ($400V/\sqrt{3}$). Each conversion device 1 that outputs the phase voltage requires about 327V (($400V/\sqrt{3}$)×$\sqrt{2}$) as the voltage of a DC bus $L_B$. This means that the voltage of the DC bus $L_B$ is reduced (566V→327V) as compared to a case where the line-to-line voltage (400V) of the three-phase AC system 3 is supplied by a single three-phase inverter. Therefore, the withstand voltage properties of switching elements and other electronic devices do not require 1200V, but about 600V is sufficient.

<<Conversion Device>>

Figure 2:
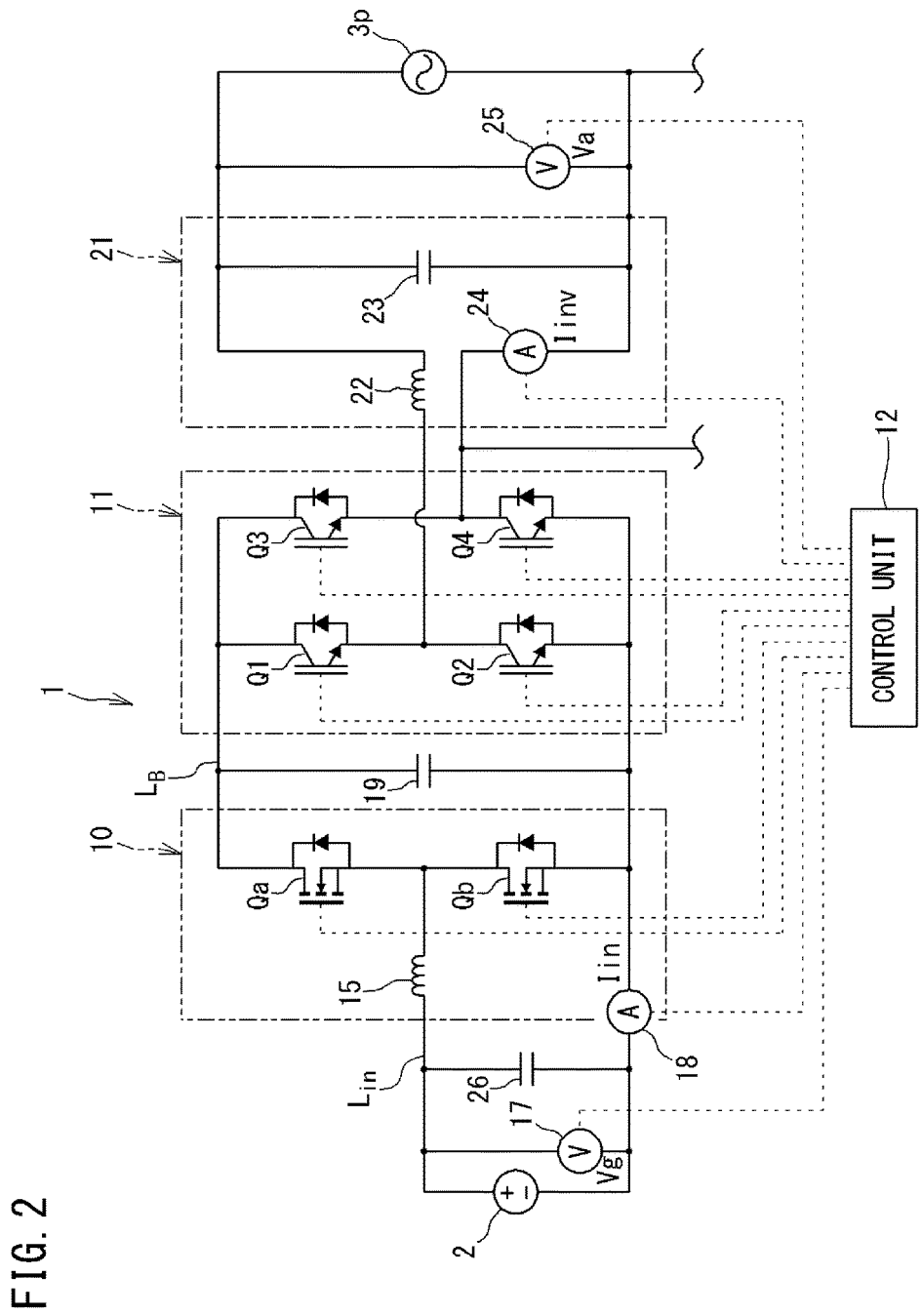
FIG. 2 is a diagram showing in more detail an internal circuit of one conversion device in FIG. 1.

FIG. 2 is a diagram showing in more detail an internal circuit of one conversion device 1 in FIG. 1. In FIG. 2, the photovoltaic panel 2 as a DC power supply is connected to the input end of the conversion device 1, and a system phase power supply $3p$ (the phase voltage of the three-phase AC) is connected to the output end of the conversion device 1. The conversion device 1 performs system interconnection operation to convert DC power generated by the photovoltaic panel 2 to AC power and output the AC power to the system phase power supply $3p$.

The conversion device 1 includes: a step-up circuit 10 which receives DC power outputted from the photovoltaic panel 2; and a single-phase inverter circuit 11 which converts power given from the step-up circuit 10, to AC power, and outputs the AC power to the system phase power supply $3p$. The step-up circuit 10 and the single-phase inverter circuit 11 are controlled by a control unit 12. The control unit 12 can control any of the three conversion devices 1.

The step-up circuit 10 includes a DC reactor 15, and switching elements Qa and Qb composed of, for example, FETs (Field Effect Transistors), to form a step-up chopper circuit.

On an input side of the step-up circuit 10, a first voltage sensor 17, a first current sensor 18, and a capacitor 26 for smoothing are provided.

The first voltage sensor 17 detects a DC input voltage detection value Vg (DC input voltage value) of DC power outputted from the photovoltaic panel 2 and then inputted to the step-up circuit 10, and outputs the DC input voltage detection value Vg to the control unit 12. The first current sensor 18 detects a step-up circuit current detection value Iin (DC input current value) of current flowing in the DC reactor 15, and outputs the step-up circuit current detection value Iin to the control unit 12. In order to detect a DC input current detection value Ig, a current sensor may be further provided at a stage preceding the capacitor 26.

The control unit 12 has a function of calculating input power Pin from the DC input voltage detection value Vg and the step-up circuit current detection value Iin and performing maximum power point tracking (MPPT) control for the photovoltaic panel 2.

During step-up operation, the switching elements Qa and Qb of the step-up circuit 10 are alternately turned on by high-frequency PWM control. When the step-up operation is stopped, the switching element Qa is turned on and the switching element Qb is turned off. From the perspective as to whether the step-up circuit 10 is operating or is stopped, as described later, control is performed so that a period in which high-frequency switching operation is performed is alternately switched between the step-up circuit 10 and the single-phase inverter circuit 11. Therefore, during a period in which the step-up circuit 10 is performing switching operation, the step-up circuit 10 outputs power with stepped-up voltage to the single-phase inverter circuit 11, and during a period in which the switching operation is stopped, the step-up circuit 10 outputs, to the single-phase inverter circuit 11, DC power outputted from the photovoltaic panel 2 and then inputted to the step-up circuit 10, without stepping up the voltage of the DC power.

A capacitor 19 (smoothing capacitor) for smoothing is connected between the step-up circuit 10 and the single-phase inverter circuit 11.

The single-phase inverter circuit 11 includes switching elements Q1 to Q4 each composed of, for example, an IGBT (Insulated Gate Bipolar Transistor). The switching elements Q1 to Q4 form a full-bridge circuit.

The switching elements Q1 to Q4 are connected to the control unit 12, and can be controlled by the control unit 12. The control unit 12 performs PWM control of operations of the switching elements Q1 to Q4. Thereby, the single-phase inverter circuit 11 converts power given from the step-up circuit 10 to AC power.

The conversion device 1 includes a filter circuit 21 between the single-phase inverter circuit 11 and the system phase power supply 3p.

The filter circuit 21 is composed of an AC reactor 22 and a capacitor 23 (output smoothing capacitor) provided at a stage subsequent to the AC reactor 22. The filter circuit 21 has a function to remove a high-frequency component contained in AC power outputted from the single-phase inverter circuit 11. The AC power from which the high-frequency component has been removed by the filter circuit 21 is given to the system phase power supply 3p.

Thus, the step-up circuit 10 and the single-phase inverter circuit 11 convert DC power outputted from the photovoltaic panel 2 to AC power and output the converted AC power to the system phase power supply 3p via the filter circuit 21.

A second current sensor 24 for detecting an inverter current detection value Iinv (current flowing in the AC reactor 22) which is a current value of output of the single-phase inverter circuit 11 is connected to the filter circuit 21. A second voltage sensor 25 for detecting a voltage value (system voltage detection value Va) on the system phase power supply 3p side is connected between the filter circuit 21 and the system phase power supply 3p.

The second current sensor 24 and the second voltage sensor 25 respectively output the detected inverter current detection value Iinv and the detected system voltage detection value Va (the voltage value of the AC system) to the control unit 12. Although the second current sensor 24 is provided at a stage preceding the capacitor 23 in FIG. 2, the second current sensor 24 may be provided at a stage subsequent to the capacitor 23.

The control unit 12 controls the step-up circuit 10 and the single-phase inverter circuit 11 based on the system voltage detection value Va, the inverter current detection value Iinv, the DC input voltage detection value Vg, and the step-up circuit current detection value Iin.

As described above, in the circuit configuration in FIG. 1, the voltage of the DC bus $L_B$ is reduced as compared to a case where the system voltage (line-to-line voltage) is supplied by a single three-phase inverter. Owing to voltage reduction in the DC bus $L_B$, switching loss in the switching elements Q1 to Q4 and Qa is reduced. In addition, iron loss in the reactors (DC reactor 15, AC reactor 22) in the conversion device 1 is reduced. Further, for the switching elements Q1 to Q4, Qa, and Qb and the smoothing capacitor 19 connected to the DC bus $L_B$, even the ones having low withstand voltage properties can be used. Since a switching element having a lower withstand voltage property has a lower ON resistance, conduction loss can be reduced.

(First Example of Waveform)

Figure 14:
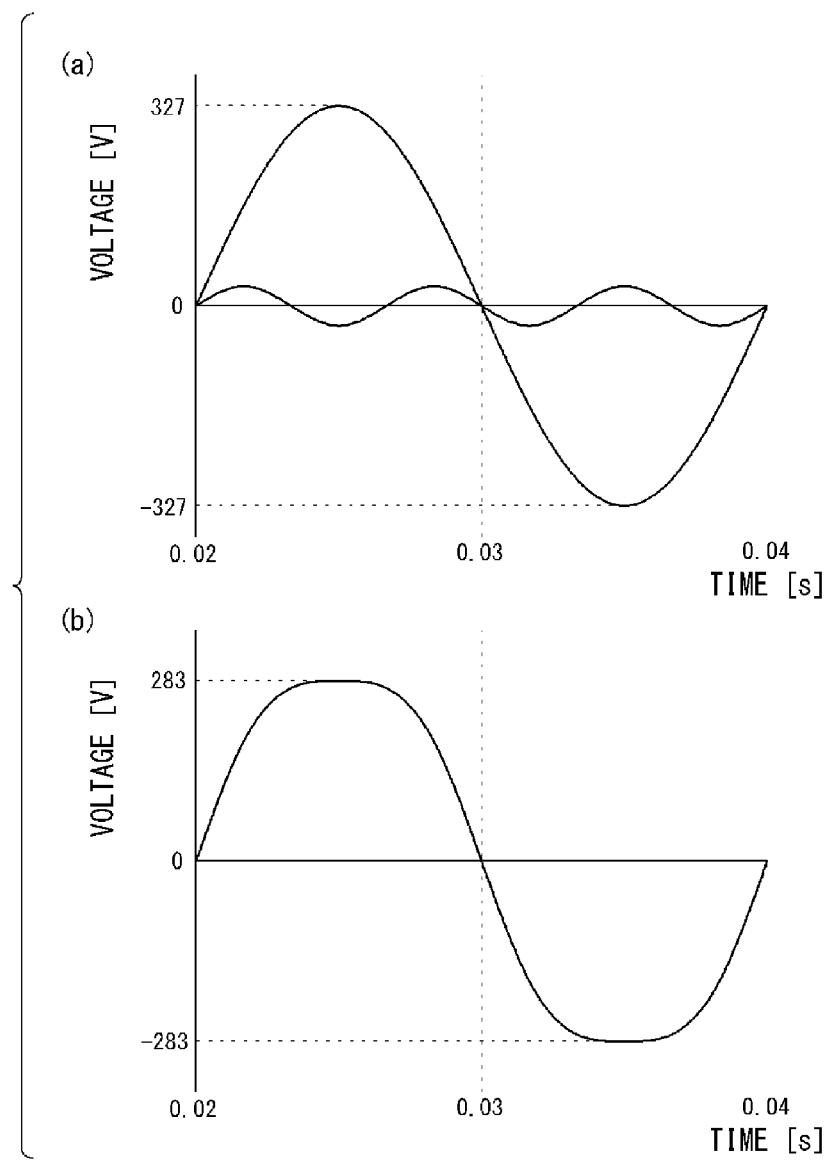
FIG. 14 is a graph showing the way of generating a command value for an output waveform (first example) in the conversion device.

FIG. 14 is a graph showing the way of generating a command value for the output waveform (first example) in the conversion device 1. The horizontal axis indicates time and the vertical axis indicates voltage. The waveform of the command value is obtained by using, as a fundamental wave, a sine wave having a wave crest value of 327V and a commercial frequency (50 Hz, 0.02 sec per cycle) as shown in (a), and superimposing, on the fundamental wave, a third-order harmonic having a frequency three times as high as that of the fundamental wave. The amplitude of the third-order harmonic is, for example, 10% of the amplitude of the fundamental wave. By superimposing the two waveforms, an AC waveform containing a third-order harmonic as shown in (b) is obtained. The peak value (wave crest value) of this AC wave becomes, due to its waveform, lower than that of the fundamental wave shown in (a), i.e., becomes $327 \times \sqrt{3}/2 = 283$ [V]. That is, owing to the effect of reducing the wave crest value by superimposition of the third-order harmonic, the voltage of the DC bus is further reduced. Such an AC waveform can be used as the voltage target value for the AC that is to be outputted by the conversion device 1.

(Second Example of Waveform)

Figure 15:
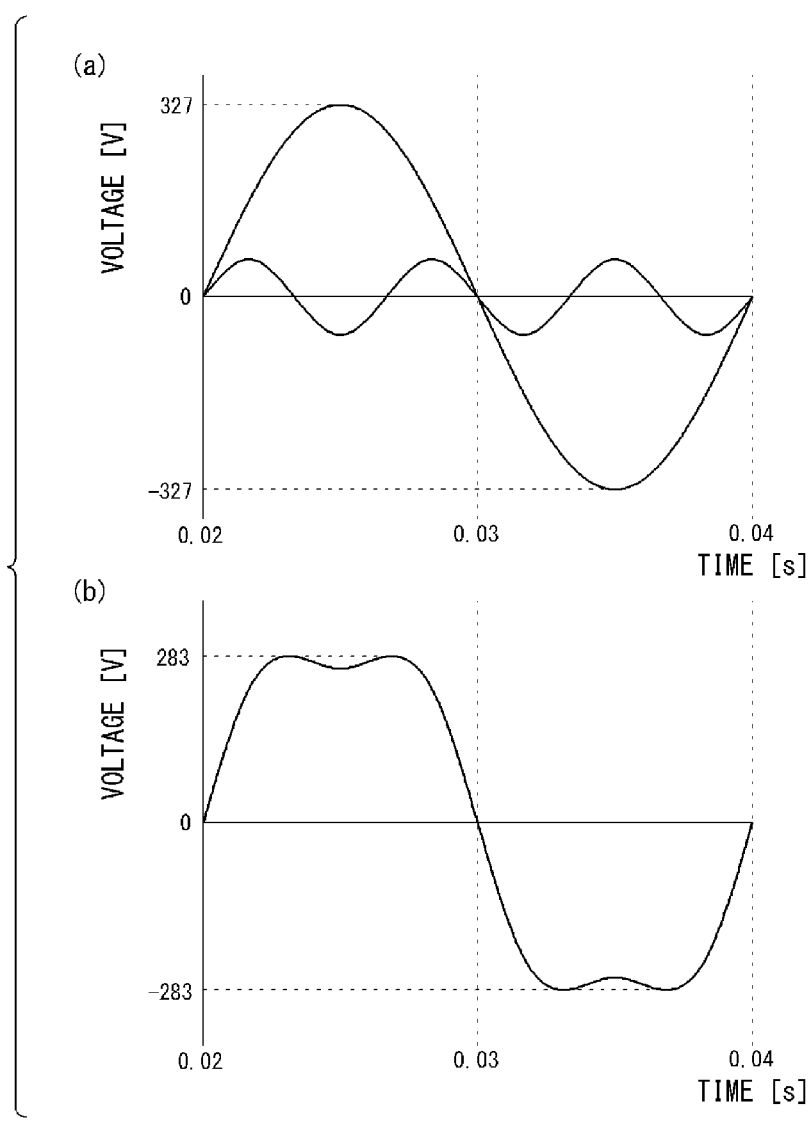
FIG. 15 is a graph showing the way of generating a command value for an output waveform (second example) in the conversion device.

FIG. 15 is a graph showing the way of generating a command value for the output waveform (second example) in the conversion device 1. The horizontal axis indicates time and the vertical axis indicates voltage. The waveform of the command value is obtained by using, as a fundamental wave, a sine wave having a wave crest value of 327V and a commercial frequency (50 Hz, 0.02 sec per cycle) as shown in (a), and superimposing, on the fundamental wave, a third-order harmonic having a frequency three times as high as that of the fundamental wave. The amplitude of the third-order harmonic is, for example, 20% of the amplitude of the fundamental wave. By superimposing the two waveforms, an AC waveform containing a third-order harmonic as shown in (b) is obtained. The peak value (wave crest value) of this AC wave becomes, due to its waveform, lower than that of the fundamental wave shown in (a), i.e., becomes 327×√3/2=283 [V]. That is, owing to the effect of reducing the wave crest value by superimposition of the third-order harmonic, the voltage of the DC bus is further reduced. Such an AC waveform can be used as the voltage target value for the AC that is to be outputted by the conversion device 1.

<<Minimum Modulation Method in Power Conversion Device>>

(First Example of Waveform)

Figure 16:
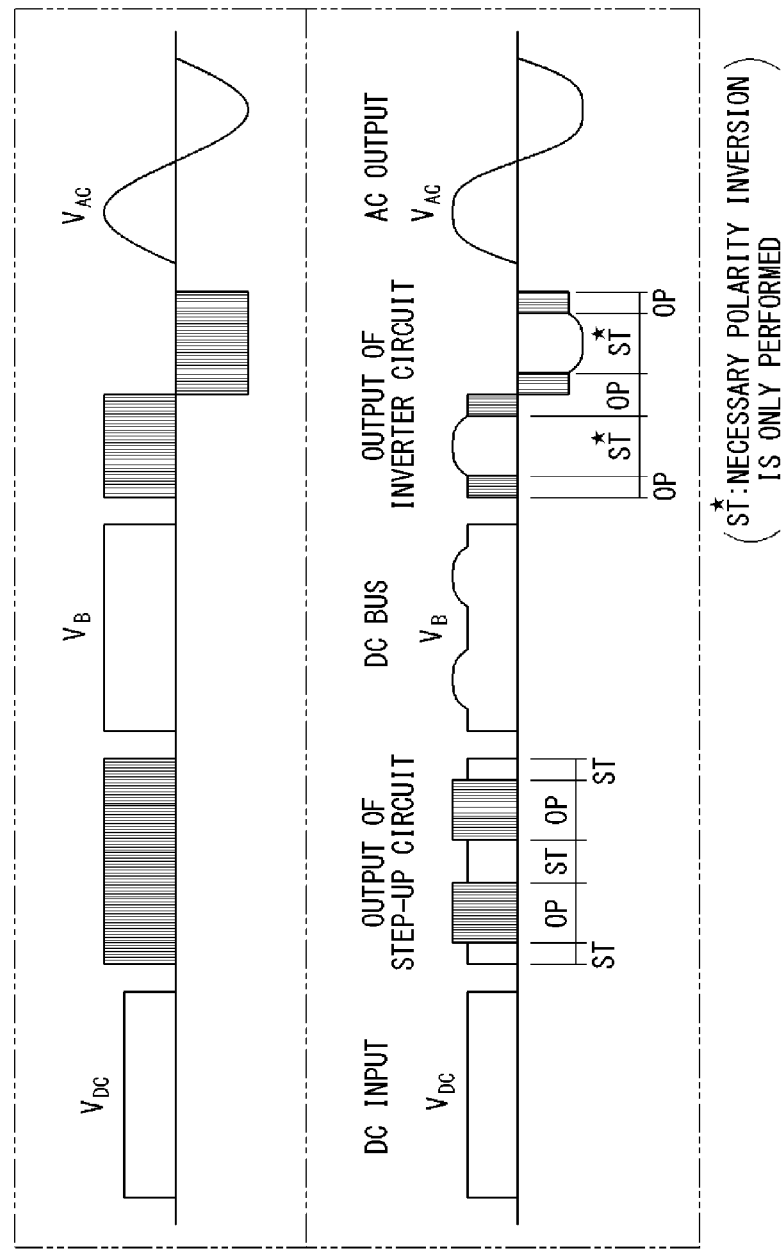
FIG. 16 is a waveform diagram (horizontally depicted) schematically showing the feature of operation of the conversion device in a case where a voltage target value for the AC that is to be outputted has the waveform shown in FIG. 14.
Figure 17:
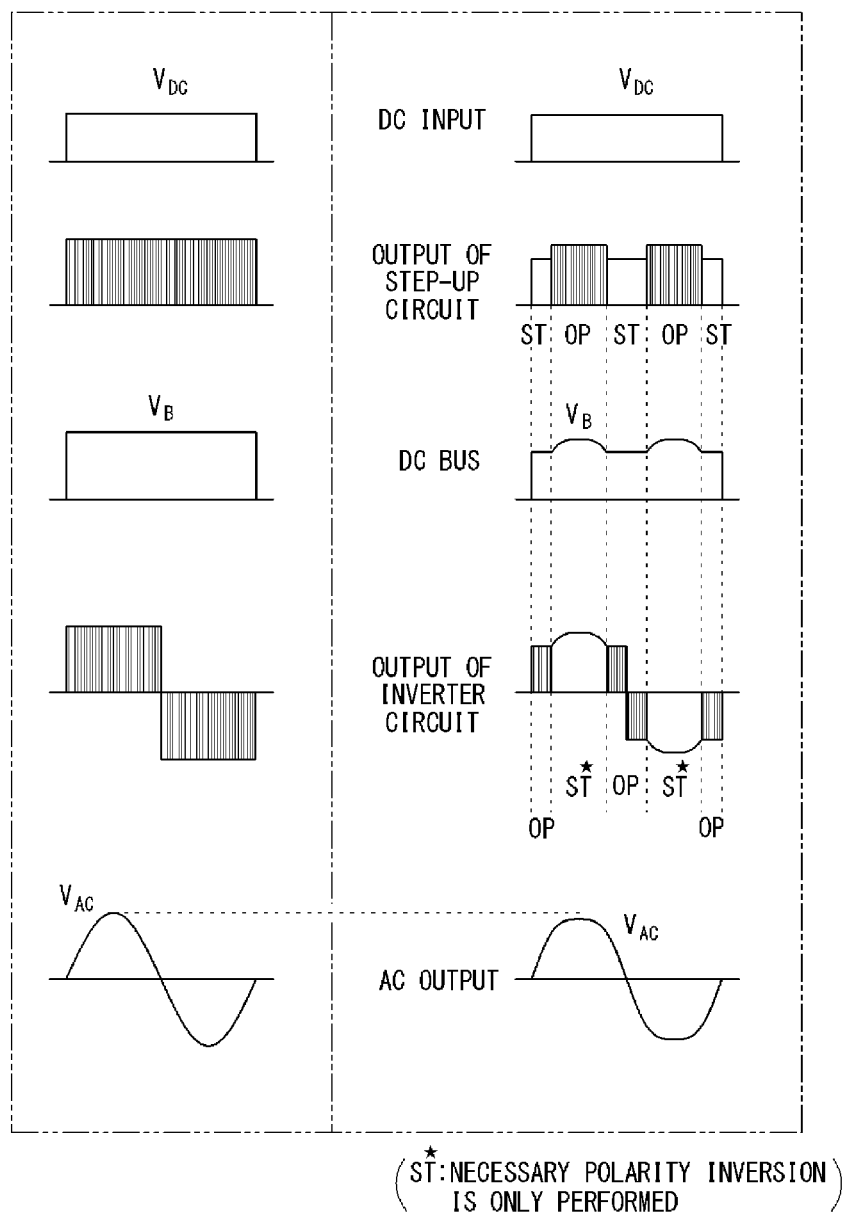
FIG. 17 is a waveform diagram (vertically depicted) schematically showing the feature of operation of the conversion device in a case where a voltage target value for the AC that is to be outputted has the waveform shown in FIG. 14.

Next, FIG. 16 and FIG. 17 are waveform diagrams schematically showing the feature of operation of the conversion device 1 in a case where the voltage target value for the AC that is to be outputted has the waveform shown in FIG. 14. FIG. 16 and FIG. 17 show the same content, in which FIG. 16 particularly shows the relationship of amplitudes from DC input to AC output in a visible manner, and FIG. 17 particularly shows timings of control in a visible manner. The upper stage in FIG. 16 and the left column in FIG. 17 show waveform diagrams indicating operation of a conventional conversion device which does not use the minimum modulation method, for comparison. The lower stage in FIG. 16 and the right column in FIG. 17 show waveform diagrams indicating operation of the conversion device 1 (FIG. 2) using the minimum modulation method.

First, in the upper stage in FIG. 16 (or the left column in FIG. 17), in the conventional conversion device, output (in FIG. 2, voltage arising at the mutual connection point among the switching elements Qa and Qb and the DC reactor 15) of the step-up circuit in response to DC input $V_{DC}$, is a pulse train having a higher value than $V_{DC}$ and arranged at regular intervals. In the drawings, for convenience sake, the pulse train is represented by thin vertical stripes (the same applies hereafter). This output is smoothed to arise as the voltage $V_B$ on the DC bus $L_B$. On the other hand, the single-phase inverter circuit performs switching under PWM control while inverting the polarity per half cycle. As a result, sinusoidal AC voltage $V_{AC}$ as AC output is obtained via smoothing by the filter circuit.

Next, in the minimum modulation method at the lower stage in FIG. 16, the step-up circuit 10 and the single-phase inverter circuit 11 in FIG. 2 operate in accordance with a result of comparison between the absolute value of the voltage target value $V_{AC}$ having an AC waveform, and the DC input $V_{DC}$. That is, when the absolute value of the voltage target value satisfies $V_{AC}<V_{DC}$ (or $V_{AC} \le V_{DC}$), the step-up circuit 10 is stopped ("ST" in the drawing), and when the absolute value of the voltage target value satisfies $V_{AC} \ge V_{DC}$ (or $V_{AC}>V_{DC}$), the step-up circuit 10 performs step-up operation ("OP" in the drawing) so as to output the absolute value of the voltage target value. A high-frequency component of the output of the step-up circuit 10 is smoothed by the capacitor 19 (FIG. 2), and the resultant output arises as the shown voltage $V_B$ on the DC bus $L_B$.

On the other hand, as for the single-phase inverter circuit 11, in accordance with a result of comparison between the absolute value of the voltage target value $V_{AC}$ and the DC input $V_{DC}$, when $V_{AC}<V_{DC}$ (or $V_{AC} \le V_{DC}$) is satisfied, high-frequency switching is performed ("OP" in the drawing), and when $V_{AC} \ge V_{DC}$ (or $V_{AC}>V_{DC}$) is satisfied, the high-frequency switching is stopped ("ST" in the drawing). When the single-phase inverter circuit 11 stops high-frequency switching, the single-phase inverter circuit 11 selects either the state in which the switching elements Q1 and Q4 are ON and the switching elements Q2 and Q3 are OFF, or the state in which the switching elements Q1 and Q4 are OFF and the switching elements Q2 and Q3 are ON, thereby only performing necessary polarity inversion. The output of the single-phase inverter circuit 11 is smoothed by the filter circuit 21, whereby desired AC output is obtained.

Here, as shown in the right column in FIG. 17, the step-up circuit 10 and the single-phase inverter circuit 11 alternately perform high-frequency switching. When the step-up circuit 10 performs step-up operation, the single-phase inverter circuit 11 stops high-frequency switching and only performs necessary polarity inversion for the voltage of the DC bus $L_B$. On the other hand, when the single-phase inverter circuit 11 performs high-frequency switching operation, the step-up circuit 10 is stopped, to allow the voltage on an electric path $L_{in}$ (FIG. 2) to pass as it is.

By the step-up circuit 10 and the single-phase inverter circuit 11 alternately performing high-frequency switching operation as described above, the number of times the switching elements Q1 to Q4, Qa, and Qb perform switching is reduced as a whole, and accordingly, the switching loss is greatly reduced. While the frequency of the high-frequency switching is, for example, 20 kHz, the frequency of switching in the polarity inversion by the single-phase inverter circuit 11 is 100 Hz or 120 Hz, which is twice as high as the commercial frequency. That is, the frequency of the polarity inversion is very low as compared to the frequency of the high-frequency switching, and therefore the switching loss is also small.

In addition, by the step-up circuit 10 and the single-phase inverter circuit 11 alternately performing high-frequency switching operation, iron loss in the reactors (DC reactor 15, AC reactor 22) is reduced.

In addition, owing to the effect of reducing the wave crest value (327V→283V) by superimposition of the third-order harmonic, the voltage of the DC bus is further reduced. This further contributes to reduction in switching loss and reduction in iron loss in the reactor.

In addition, the capacitor 19 only needs to smooth the high-frequency of the switching. Therefore, the capacitor 19 does not need to have a function of smoothing a low-frequency AC component that is three times as high as the system frequency. Therefore, a capacitor having a low capacitance (for example, 10 μF or 22 μF) can be used.

Figure 18:
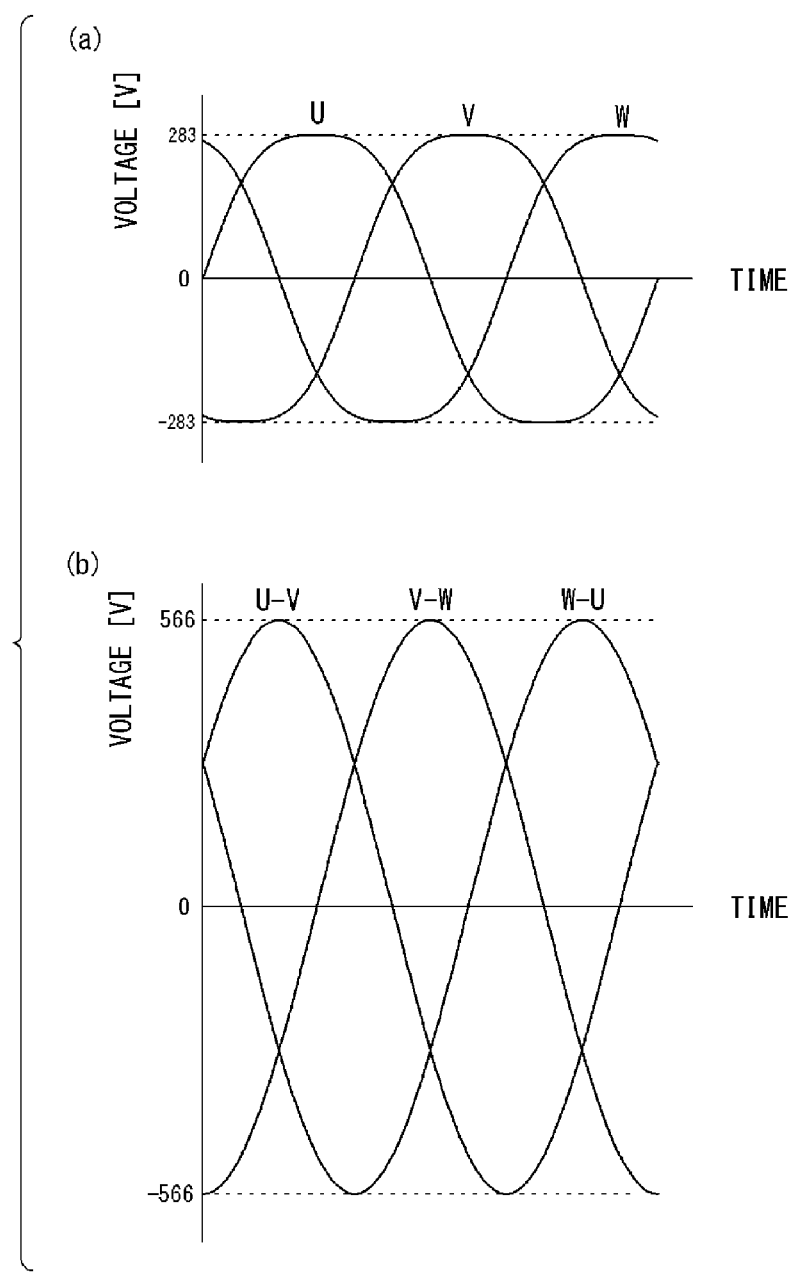
FIG. 18 is a waveform diagram in which (a) shows phase voltages for U, V, W outputted from the power conversion device, and (b) shows line-to-line voltages for U-V, V-W, W-U with respect to the three-phase AC system.

FIG. 18 is a waveform diagram in which (a) shows phase voltages for U, V, W outputted from the power conversion device 1P, and (b) shows line-to-line voltages for U-V, V-W, W-U with respect to the three-phase AC system 3.

The control unit 12 controls the conversion device 1 for each phase so that the phases of the AC waveforms outputted therefrom are shifted from each other by (⅔)π. Even though each phase voltage contains the third-order harmonic, the third-order harmonics are cancelled in the line-to-line voltage, and thus three-phase line-to-line voltages having phases shifted from each other by (⅔)π and having a wave crest value of 566V (=400×√2=283×2) are obtained as in a case of phase voltages of normal sine waves.

(Second Example of Waveform)

Figure 19:
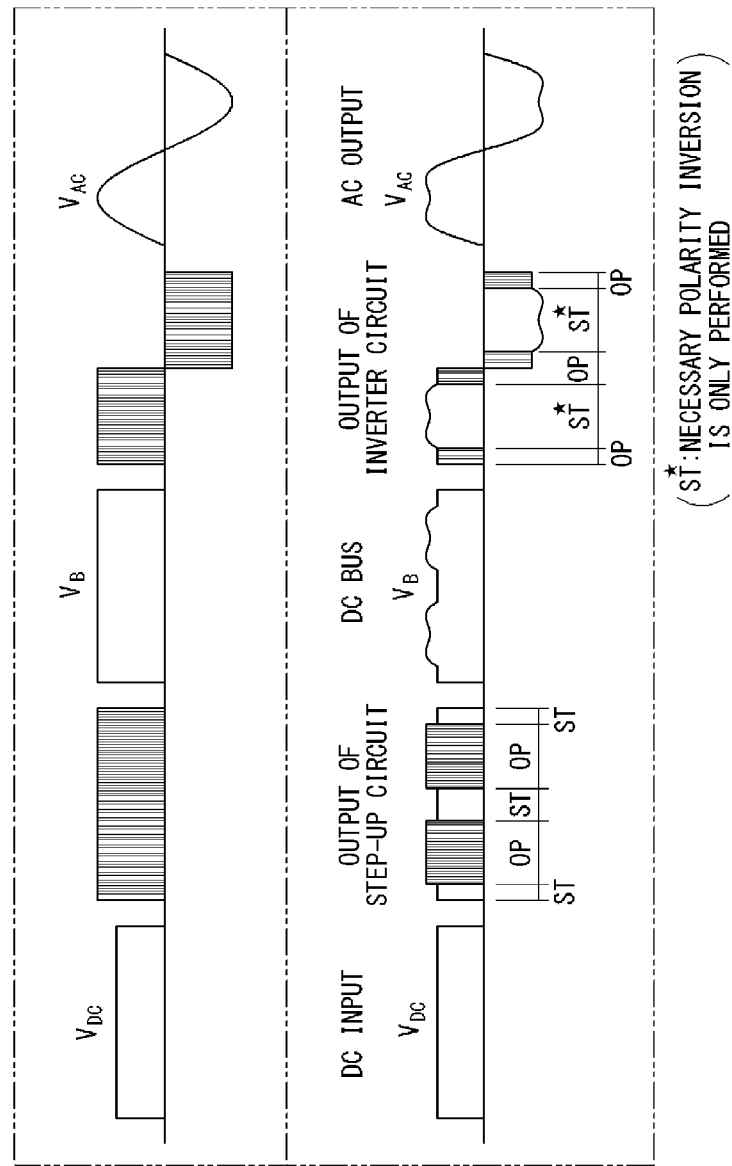
FIG. 19 is a waveform diagram (horizontally depicted) schematically showing the feature of operation of the conversion device in a case where a voltage target value for the AC that is to be outputted has the waveform shown in FIG. 15.
Figure 20:
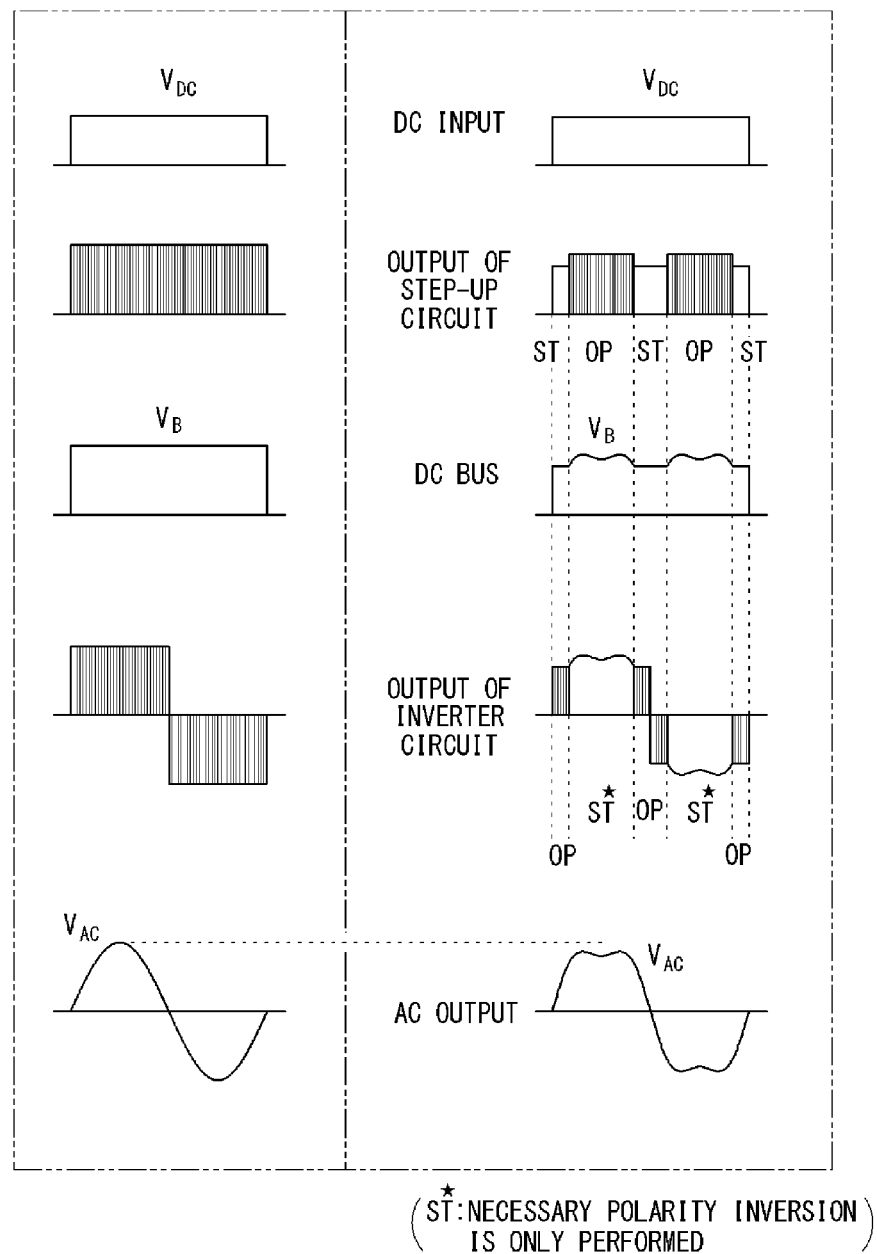
FIG. 20 is a waveform diagram (vertically depicted) schematically showing the feature of operation of the conversion device in a case where a voltage target value for the AC that is to be outputted has the waveform shown in FIG. 15.

Similarly, FIG. 19 and FIG. 20 are waveform diagrams schematically showing the feature of operation of the conversion device 1 in a case where the voltage target value for the AC that is to be outputted has the waveform shown in FIG. 15. FIG. 19 and FIG. 20 show the same content, in which FIG. 19 particularly shows the relationship of amplitudes from DC input to AC output in a visible manner, and FIG. 20 particularly shows timings of control in a visible manner. The upper stage in FIG. 19 and the left column in FIG. 20 show waveform diagrams indicating operation of a conventional conversion device which does not use the minimum modulation method, for comparison. The lower stage in FIG. 19 and the right column in FIG. 20 show waveform diagrams indicating operation of the conversion device 1 (FIG. 2) using the minimum modulation method.

The operation of the conventional conversion device shown in the upper stage in FIG. 19 or the left column in FIG. 20 is as already described with reference to FIG. 16 and FIG. 17, and thus the description thereof is omitted here.

In the minimum modulation method at the lower stage in FIG. 19, the step-up circuit 10 and the single-phase inverter circuit 11 in FIG. 2 operate in accordance with a result of comparison between the absolute value of the voltage target value $V_{AC}$ having an AC waveform, and the DC input $V_{DC}$. That is, when the absolute value of the voltage target value satisfies $V_{AC}<V_{DC}$ (or $V_{AC}\leq V_{DC}$), the step-up circuit 10 is stopped ("ST" in the drawing), and when the absolute value of the voltage target value satisfies $V_{AC}\geq V_{DC}$ (or $V_{AC}>V_{DC}$), the step-up circuit 10 performs step-up operation ("OP" in the drawing) so as to output the absolute value of the voltage target value. A high-frequency component of the output of the step-up circuit 10 is smoothed by the capacitor 19 (FIG. 2), and the resultant output arises as the shown voltage $V_B$ on the DC bus $L_B$.

On the other hand, as for the single-phase inverter circuit 11, in accordance with a result of comparison between the absolute value of the voltage target value $V_{AC}$ and the DC input $V_{DC}$, when $V_{AC}<V_{DC}$ (or $V_{AC}\leq V_{DC}$) is satisfied, high-frequency switching is performed ("OP" in the drawing), and when $V_{AC}\geq V_{DC}$ (or $V_{AC}>V_{DC}$) is satisfied, the high-frequency switching is stopped ("ST" in the drawing). When the single-phase inverter circuit 11 stops high-frequency switching, the single-phase inverter circuit 11 selects either the state in which the switching elements Q1 and Q4 are ON and the switching elements Q2 and Q3 are OFF, or the state in which the switching elements Q1 and Q4 are OFF and the switching elements Q2 and Q3 are ON, thereby only performing necessary polarity inversion. The output of the single-phase inverter circuit 11 is smoothed by the filter circuit 21, whereby desired AC output is obtained.

Here, as shown in the right column in FIG. 20, the step-up circuit 10 and the single-phase inverter circuit 11 alternately perform high-frequency switching. When the step-up circuit 10 performs step-up operation, the single-phase inverter circuit 11 stops high-frequency switching and only performs necessary polarity inversion for the voltage of the DC bus $L_B$. On the other hand, when the single-phase inverter circuit 11 performs high-frequency switching operation, the step-up circuit 10 is stopped, to allow the voltage on an electric path $L_{in}$ (FIG. 2) to pass as it is.

By the step-up circuit 10 and the single-phase inverter circuit 11 alternately performing high-frequency switching operation as described above, the number of times the switching elements Q1 to Q4, Qa, and Qb perform switching is reduced as a whole, and accordingly, the switching loss is greatly reduced. While the frequency of the high-frequency switching is, for example, 20 kHz, the frequency of switching in the polarity inversion by the single-phase inverter circuit 11 is 100 Hz or 120 Hz, which is twice as high as the commercial frequency. That is, the frequency of the polarity inversion is very low as compared to the frequency of the high-frequency switching, and therefore the switching loss is also small.

In addition, by the step-up circuit 10 and the single-phase inverter circuit 11 alternately performing high-frequency switching operation, iron loss in the reactors (DC reactor 15, AC reactor 22) is reduced.

In addition, owing to the effect of reducing the wave crest value (327V→283V) by superimposition of the third-order harmonic, the voltage of the DC bus is further reduced. This further contributes to reduction in switching loss and reduction in iron loss in the reactor.

In addition, the capacitor 19 only needs to smooth the high-frequency of the switching. Therefore, the capacitor 19 does not need to have a function of smoothing a low-frequency AC component that is three times as high as the system frequency. Therefore, a capacitor having a low capacitance (for example, 10 μF or 22 μF) can be used.

Figure 21:
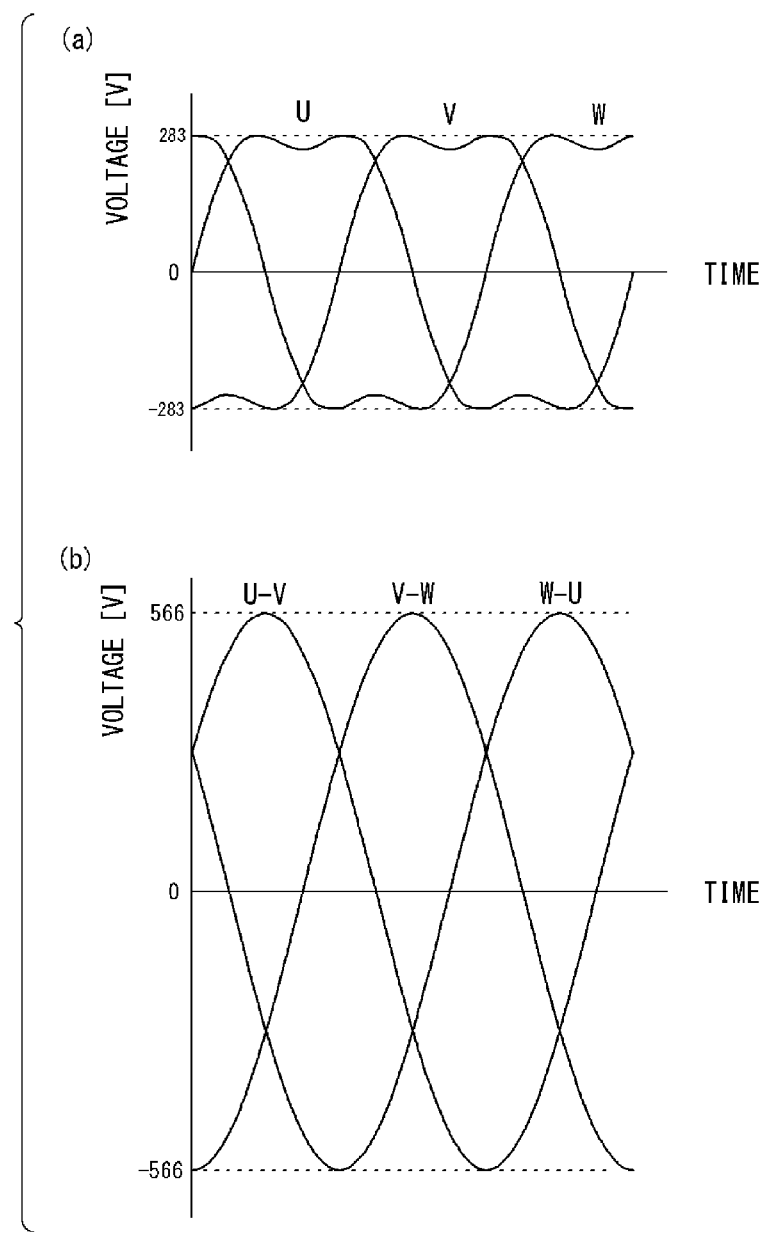
FIG. 21 is a waveform diagram in which (a) shows phase voltages for U, V, W outputted from the power conversion device, and (b) shows line-to-line voltages for U-V, V-W, W-U with respect to the three-phase AC system 3.

FIG. 21 is a waveform diagram in which (a) shows phase voltages for U, V, W outputted from the power conversion device 1P, and (b) shows line-to-line voltages for U-V, V-W, W-U with respect to the three-phase AC system 3.

The control unit 12 controls the conversion device 1 for each phase so that the phases of the AC waveforms outputted therefrom are shifted from each other by $(2/3)\pi$. Even though each phase voltage contains the third-order harmonic, the third-order harmonics are cancelled in the line-to-line voltage, and thus three-phase line-to-line voltages having phases shifted from each other by $(2/3)\pi$ and having a wave crest value of 566V ($=400\times\sqrt{2}=283\times 2$) are obtained as in a case of phase voltages of normal sine waves.

(SUMMARY)

As described above, the step-up circuit 10 and the single-phase inverter circuit 11 alternately perform high-frequency switching such that, when one of them performs high-frequency switching, the other one stops high-frequency switching. In this case, the peak value $V_B$ of voltage of the DC bus $L_B$ only needs to be the wave crest value of the voltage $V_{AC}$, i.e., $V_B=\sqrt{2}\cdot V_{AC}$.

As a result, the voltage of the DC bus $L_B$ is reduced as compared to a case of supplying system voltage (line-to-line voltage) by a single three-phase inverter. In addition, owing to the effect of reducing the wave crest value by superimposition of the third-order harmonic, the voltage of the DC bus $L_B$ is further reduced.

The voltage reduction in the DC bus $L_B$ provides the following advantages. First, switching loss in the switching elements (Q1 to Q4, Qa, Qb) is reduced. In addition, iron loss in the reactors (DC reactor 15, AC reactor 22) is reduced. Further, for the switching elements and the smoothing capacitor 19 connected to the DC bus $L_B$, even the ones having low withstand voltage properties can be used. Since a switching element having a lower withstand voltage property has a lower ON resistance, conduction loss can be reduced.

In addition, as a result of the alternate high-frequency switching operations in the step-up circuit 10 and the single-phase inverter circuit 11, the number of times the switching elements perform switching is reduced as a whole, and accordingly, switching loss is greatly reduced. In addition, iron loss in the reactors (DC reactor 15, AC reactor 22) is reduced. Further, the capacitor 19 is not required to have a function of smoothing a low-frequency AC component that is three times as high as the system frequency, and therefore a capacitor with a low capacitance can be used.

<<System Interconnection of Power Conversion Device>>

Hereinafter, system interconnection of the power conversion device 1P will be described in detail.

In order to perform system interconnection, it is necessary to control the phases of outputted currents so that the conversion devices 1 for the respective phases convey powers at a power factor of 1 to the three-phase AC system 3. That is, it is necessary to not only output voltage having a phase coinciding with the voltage phase of each system phase power supply 3p, but also cause the voltage phase of each system phase power supply 3p to coincide with the phase of current outputted from the corresponding conversion device 1.

[1.1 Control Unit]

Figure 3:
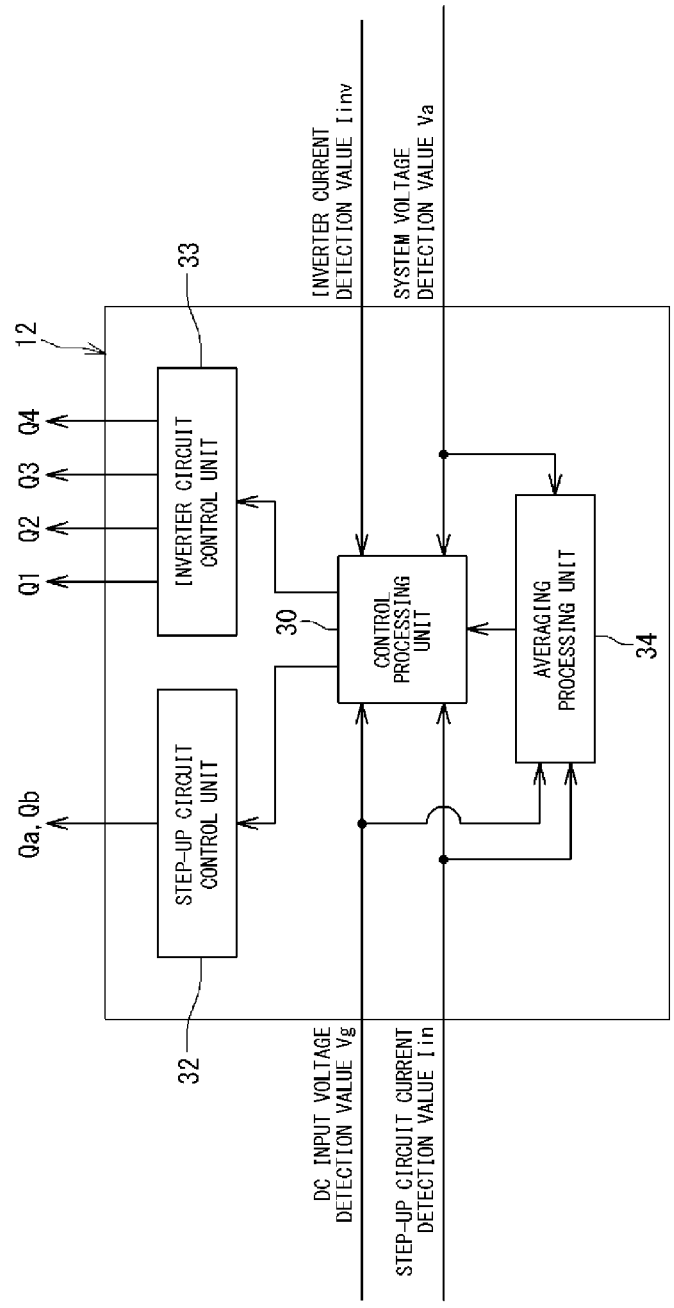
FIG. 3 is a block diagram of a control unit.

FIG. 3 is a block diagram of the control unit 12. As shown in FIG. 3, the control unit 12 functionally has a control processing unit 30, a step-up circuit control unit 32, an inverter circuit control unit 33, and an averaging processing unit 34.

Some or all of the functions of the control unit 12 may be configured as a hardware circuit, or may be realized by software (computer program) executed by a computer. Such software (computer program) for realizing a function of the control unit 12 is stored in a storage device (not shown) of the computer.

The step-up circuit control unit 32 controls the switching elements Qa and Qb of the step-up circuit 10 based on a command value and a detection value given from the control processing unit 30, thereby causing the step-up circuit 10 to output power having current corresponding to the command value.

The inverter circuit control unit 33 controls the switching elements Q1 to Q4 of the single-phase inverter circuit 11 based on a command value and a detection value given from the control processing unit 30, thereby causing the single-phase inverter circuit 11 to output power having current corresponding to the command value.

The control processing unit 30 receives the DC input voltage detection value Vg, the step-up circuit current detection value Iin, the system voltage detection value Va, and the inverter current detection value Iine.

The control processing unit 30 calculates the input power Pin and an average value <Pin> thereof from the DC input voltage detection value Vg and the step-up circuit current detection value Iin.

The control processing unit 30 has a function to set a DC input current command value Ig* (which will be described later) based on the input power average value <Pin> and perform MPPT control for the photovoltaic panel 2, and to perform feedback control for the step-up circuit 10 and the single-phase inverter circuit 11.

The DC input voltage detection value Vg and the step-up circuit current detection value Iin are given to the averaging processing unit 34 and the control processing unit 30.

The averaging processing unit 34 has a function to sample, at predetermined time intervals, the DC input voltage detection value Vg and the step-up circuit current detection value Iin given from the first voltage sensor 17 and the first current sensor 18, calculate their respective average values, and give the averaged DC input voltage detection value Vg and the averaged step-up circuit current detection value Iin to the control processing unit 30.

Figure 4:
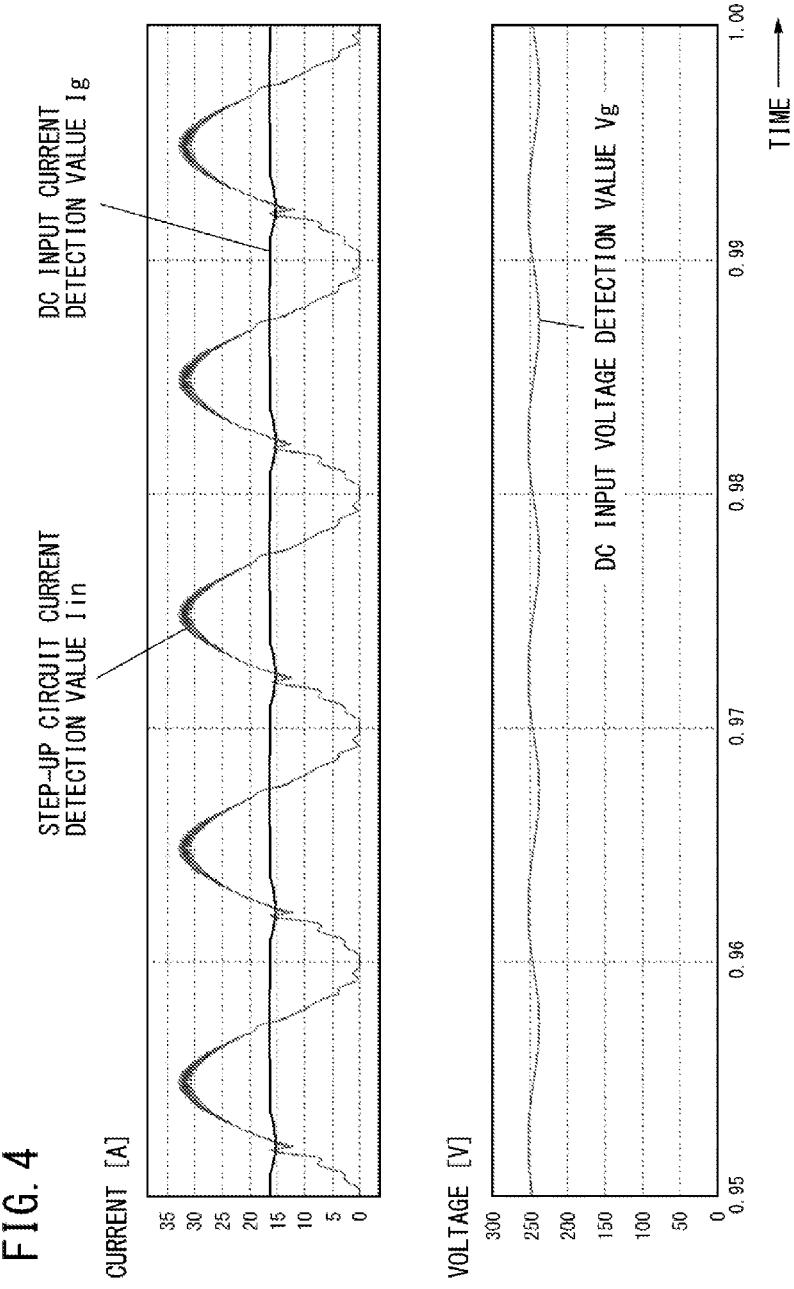
FIG. 4 is graphs showing an example of a simulation result of temporal variations in a DC input voltage detection value and a step-up circuit current detection value.

FIG. 4 is graphs showing an example of a simulation result of temporal changes in the DC input voltage detection value Vg and the step-up circuit current detection value Iin.

The DC input current detection value Ig is a current value detected on an input side relative to the capacitor 26.

As shown in FIG. 4, it is found that the DC input voltage detection value Vg, the step-up circuit current detection value Iin, and the DC input current detection value Ig vary in a half cycle of the system voltage.

The reason why the DC input voltage detection value Vg and the DC input current detection value Ig vary periodically as shown in FIG. 4 is as follows. That is, the step-up circuit current detection value Iin greatly varies between almost 0 A and a peak value in a half cycle of the AC cycle in accordance with operations of the step-up circuit 10 and the single-phase inverter circuit 11. Therefore, the variation component cannot be fully removed by the capacitor 26, and the DC input current detection value Ig is detected as pulsating current containing a component that varies in a half cycle of the AC cycle. On the other hand, output voltage of the photovoltaic panel varies depending on output current.

Therefore, the cycle of the periodic variation occurring in the DC input voltage detection value Vg is half the cycle of AC power outputted from the conversion device 1.

The averaging processing unit 34 averages the DC input voltage detection value Vg and the step-up circuit current detection value Iin in order to suppress an influence of the above periodic variations.

Figure 5:
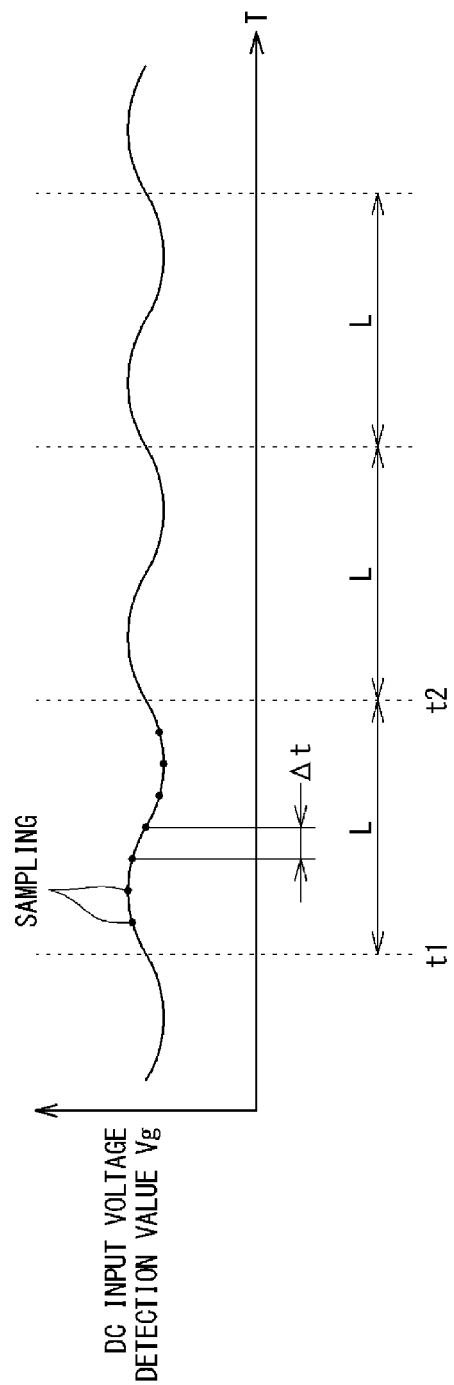
FIG. 5 is a diagram showing a manner in which an averaging processing unit averages a DC input voltage detection value.

FIG. 5 is a diagram showing a manner in which the averaging processing unit 34 averages the DC input voltage detection value Vg.

The averaging processing unit 34 samples the given DC input voltage detection value Vg a plurality of times (at timings indicated by solid dots in FIG. 5) at predetermined time intervals Δt during a period L from a timing t1 to a timing t2, and calculates an average value of the plurality of DC input voltage detection values Vg that have been obtained.

Here, the averaging processing unit 34 sets the period L to half the length of the cycle of the system phase power supply 3p. In addition, the averaging processing unit 34 sets the time interval Δt to be sufficiently shorter than half the length of the cycle of the system phase power supply 3p.

Thus, the averaging processing unit 34 can accurately obtain the average value of the DC input voltage detection value Vg which periodically varies in synchronization with the cycle of the system phase power supply 3p, using as short a sampling period as possible.

The time interval Δt of sampling may be set at, for example, 1/100 to 1/1000 of the cycle of the system phase power supply 3p, or 20 microseconds to 200 microseconds.

The averaging processing unit 34 may store the period L in advance, or may acquire the system voltage detection value Va from the second voltage sensor 25 and set the period L based on the cycle of the system phase power supply 3p.

Here, the period L is set to half the length of the cycle of the system phase power supply 3p. The average value of the DC input voltage detection value Vg can be accurately calculated at least if the period L is set to half the cycle of the system phase power supply 3p. This is because the DC input voltage detection value Vg periodically varies in a half cycle of the system phase power supply 3p in accordance with operations of the step-up circuit 10 and the single-phase inverter circuit 11 as described above.

Therefore, if it is required to set the period L to be longer, the period L may be set to an integer multiple of a half cycle of the system phase power supply 3p, e.g., three or four times of a half cycle of the system phase power supply 3p. Thus, the voltage variation can be grasped on a cycle basis.

As described above, the step-up circuit current detection value Iin also periodically varies in a half cycle of the system phase power supply 3p, as in the DC input voltage detection value Vg.

Therefore, the averaging processing unit 34 also calculates an average value of the step-up circuit current detection value Iin by the same method as in the DC input voltage detection value Vg shown in FIG. 5.

The control processing unit 30 sequentially calculates an average value of the DC input voltage detection value Vg and an average value of the step-up circuit current detection value Iin per the period L.

The averaging processing unit 34 gives the calculated average value of the DC input voltage detection value Vg and the calculated average value of the step-up circuit current detection value Iin to the control processing unit 30.

In the present example, as described above, the averaging processing unit 34 calculates an average value (DC input voltage average value <Vg>) of the DC input voltage detection value Vg and an average value (step-up circuit current average value <Iin>) of the step-up circuit current detection value Iin, and using these values, the control processing unit 30 controls the step-up circuit 10 and the single-phase inverter circuit 11 while performing MPPT control for the photovoltaic panel 2. Therefore, even if DC current from the photovoltaic panel 2 varies to be unstable, the control unit 12 can accurately obtain output of the photovoltaic panel 2 as the DC input voltage average value <Vg> and the step-up circuit current average value <Iin> in which a variation component due to operation of the conversion device 1 has been removed. As a result, it becomes possible to appropriately perform MPPT control and effectively suppress reduction in power generation efficiency of the photovoltaic panel 2.

As described above, in a case where voltage (DC input voltage detection value Vg) or current (step-up circuit current detection value Iin) of DC power outputted from the photovoltaic panel 2 varies due to operation of the conversion device 1, the cycle of the variation coincides with a half cycle (a half cycle of the system phase power supply 3p) of AC power outputted from the single-phase inverter circuit 11.

In this regard, in the present example, the DC input voltage detection value Vg and the step-up circuit current detection value Iin are each sampled a plurality of times at the time intervals Δt which are shorter than a half cycle of the AC system, during the period L which is set to half the length of the cycle of the system phase power supply 3p, and the DC input voltage average value <Vg> and the step-up circuit current average value <Iin> are calculated from a result of the sampling. Therefore, even if voltage and current of the DC current vary periodically, the DC input voltage average value <Vg> and the step-up circuit current average value <Iin> can be accurately calculated, with the sampling period shortened as much as possible.

The control processing unit 30 sets the DC input current command value Ig* based on the above input power average value <Pin>, and calculates respective command values for the step-up circuit 10 and the single-phase inverter circuit 11 based on the set DC input current command value Ig* and the above values.

The control processing unit 30 has a function of giving the calculated command values to the step-up circuit control unit 32 and the inverter circuit control unit 33 and performing feedback control for the step-up circuit 10 and the single-phase inverter circuit 11.

Figure 6:
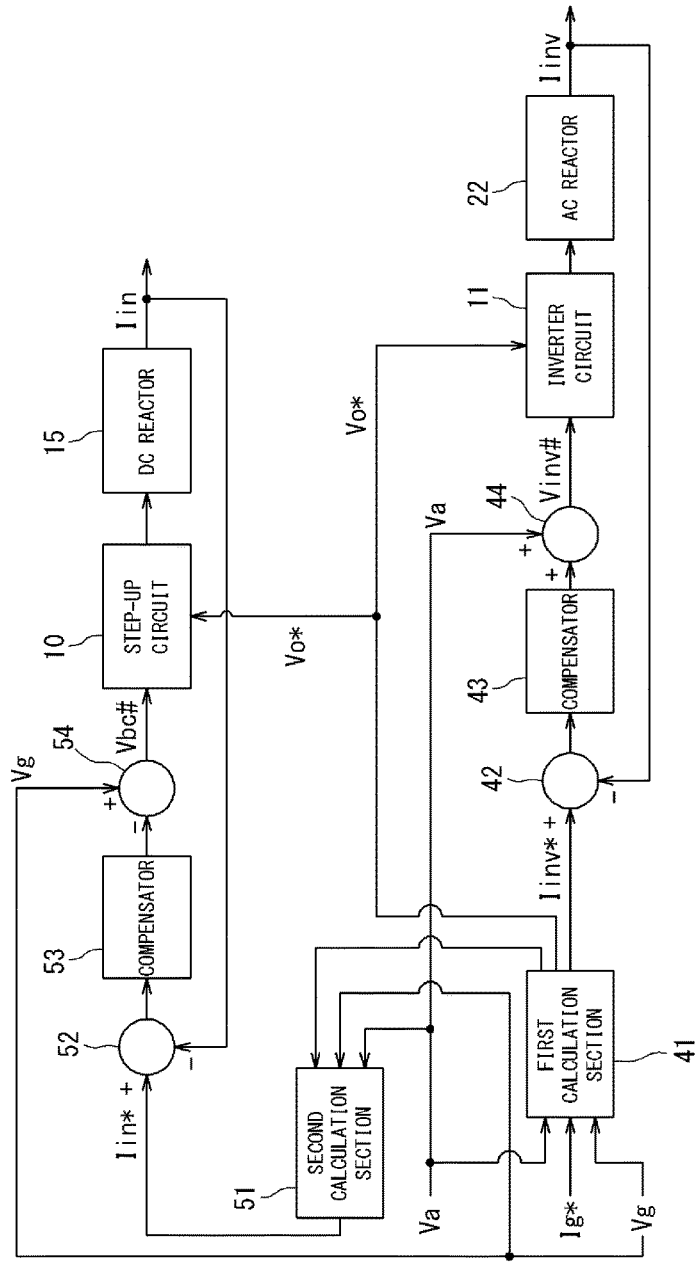
FIG. 6 is a control block diagram for explaining a control process by a control processing unit.

FIG. 6 is a control block diagram for explaining the feedback control for the step-up circuit 10 and the single-phase inverter circuit 11 by the control processing unit 30.

The control processing unit 30 includes, as function sections for controlling the single-phase inverter circuit 11, a first calculation section 41, a first adder 42, a compensator 43, and a second adder 44.

In addition, the control processing unit 30 includes, as a function section for controlling the step-up circuit 10, a second calculation section 51, a third adder 52, a compensator 53, and a fourth adder 54.

Figure 7:
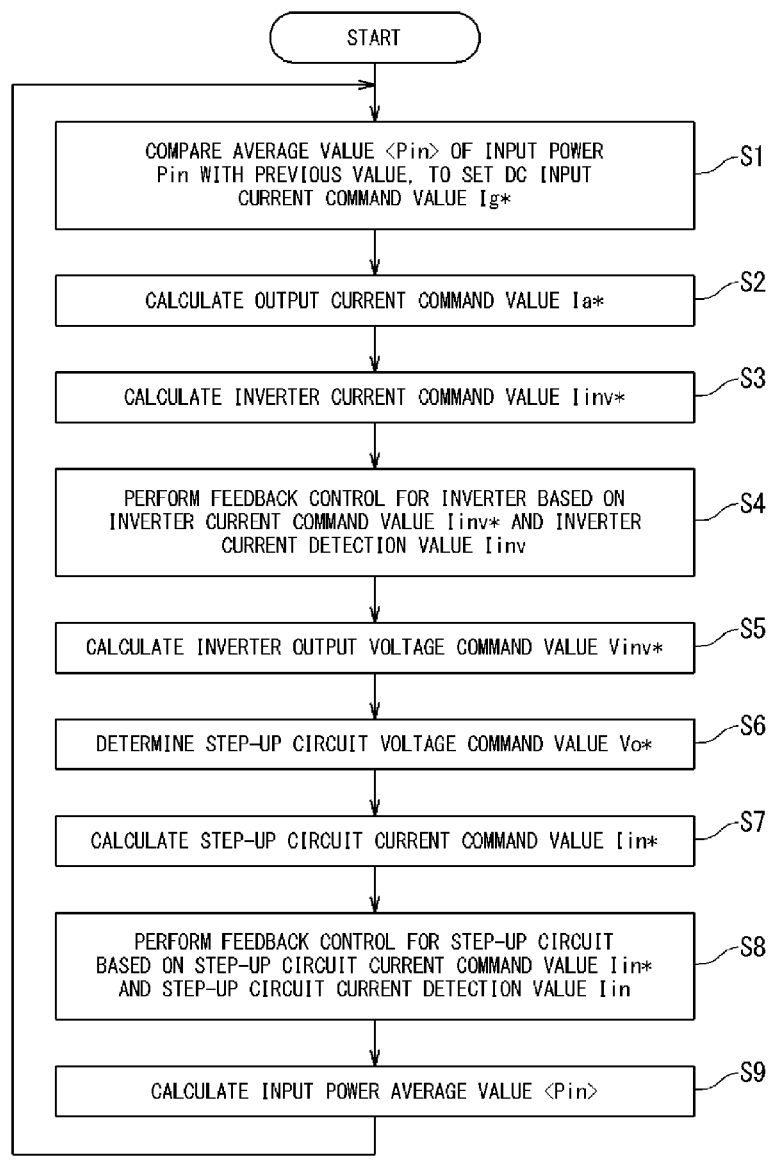
FIG. 7 is a flowchart showing a control process for a step-up circuit and a single-phase inverter circuit.

FIG. 7 is a flowchart showing a control process for the step-up circuit 10 and the single-phase inverter circuit 11. The function sections shown in FIG. 6 control the step-up circuit 10 and the single-phase inverter circuit 11 by executing the process shown in the flowchart in FIG. 7.

Hereinafter, the control process for the step-up circuit 10 and the single-phase inverter circuit 11 will be described with reference to FIG. 7.

First, the control processing unit 30 calculates the present input power average value <Pin> (step S9), and compares the present input power average value <Pin> with the input power average value <Pin> that has been previously calculated, to set the DC input current command value Ig* (step S1). The input power average value <Pin> is calculated based on the following expression (1).

$$\text{Input power average value} <Pin> = <Iin \times Vg> \tag{1}$$

In expression (1), Iin is the step-up circuit current detection value, and Vg is the DC input voltage detection value (DC input voltage value). For these values, the DC input voltage average value <Vg> and the step-up circuit current average value <Iin> which are the values averaged by the averaging processing unit 34 are used.

In each expression other than expression (1) and relevant to the control shown below, instantaneous values which are not averaged are used for the step-up circuit current detection value Iin and the DC input voltage detection value Vg.

A notation "< >" indicates an average value of a value in the brackets. The same applies hereinafter.

The control processing unit 30 gives the set DC input current command value Ig* to the first calculation section 41.

As well as the DC input current command value Ig*, the DC input voltage detection value Vg and the system voltage detection value Va are given to the first calculation section 41.

The first calculation section 41 calculates an average value <Ia*> of an output current command value for the conversion device 1, based on the following expression (2).

$$\text{Average value} <Ia^*> \text{ of output current command value} = <Ig^* \times Vg>/<Va> \tag{2}$$

Further, the first calculation section 41 calculates an output current command value Ia* (output current target value) based on the following expression (3) (step S2).

Here, the first calculation section 41 calculates the output current command value Ia* as a sine wave having the same phase as the system voltage detection value Va.

$$\text{Output current command value } Ia^* = (\sqrt{2}) \times <Ia^*> \times \sin \omega t \tag{3}$$

As described above, the first calculation section 41 calculates the output current command value Ia* based on the input power average value <Pin> (an input power value of DC power) and the system voltage detection value Va.

Next, the first calculation section 41 calculates an inverter current command value Iinv* (a current target value for the single-phase inverter circuit) which is a current target value for controlling the single-phase inverter circuit 11, as shown by the following expression (4) (step S3).

$$\text{Inverter current command value } Iinv^* = Ia^* + sCaVa \tag{4}$$

In expression (4), Ca is an electrostatic capacitance of the capacitor 23 (output smoothing capacitor), and s is the Laplace operator.

The above expression (4) is represented as follows, using a derivative with respect to time t.

$$Iinv^* = Ia^* + Ca \times (dVa/dt) \tag{4a}$$

If current flowing through the capacitor 23 is detected and the detected current is denoted by Ica, the following expression is obtained.

$$Iinv^* = Ia^* + Ica \tag{4b}$$

In expressions (4), (4a), and (4b), the second terms on the right-hand side is a value added in consideration of current flowing through the capacitor 23 of the filter circuit 21.

The output current command value Ia* is calculated as a sine wave having the same phase as the system voltage detection value Va, as shown by the above expression (3). That is, the control processing unit 30 controls the single-phase inverter circuit 11 so that current Ia (output current) of AC power outputted from the conversion device 1 has the same phase as the system voltage (system voltage detection value Va).

After calculating the inverter current command value Iinv*, the first calculation section 41 gives the inverter current command value Iinv* to the first adder 42.

The single-phase inverter circuit 11 is subjected to feedback control based on the inverter current command value Iinv*.

As well as the inverter current command value Iinv*, the present inverter current detection value Iinv is given to the first adder 42.

The first adder 42 calculates a difference between the inverter current command value Iinv* and the present inverter current detection value Iinv, and gives a result of the calculation to the compensator 43.

When the difference is given, the compensator 43 calculates, based on a proportionality coefficient or the like, an inverter voltage reference value Vinv# that allows the difference to converge so that the inverter current detection value Iinv becomes the inverter current command value Iinv*. The compensator 43 gives the inverter voltage reference value Vinv# to the inverter circuit control unit 33, thereby causing the single-phase inverter circuit 11 to output power with voltage Vinv according to the inverter voltage reference value Vinv#.

The power outputted from the single-phase inverter circuit 11, from which the system voltage detection value Va is subtracted by the second adder 44, is given to the AC reactor 22, and then fed back as a new inverter current detection value Iinv. Then, a difference between the inverter current command value Iinv* and the inverter current detection value Iinv is calculated again by the first adder 42, and the single-phase inverter circuit 11 is controlled based on the difference as described above.

As described above, the single-phase inverter circuit 11 is subjected to feedback control based on the inverter current command value Iinv* and the inverter current detection value Iinv (step S4).

On the other hand, the inverter current command value Iinv* calculated by the first calculation section 41, as well as the DC input voltage detection value Vg and the system voltage detection value Va, is given to the second calculation section 51.

The second calculation section 51 calculates an inverter output voltage command value Vinv* (a voltage target value for the single-phase inverter circuit) based on the following expression (5) (step S5).

$$\text{Inverter output voltage command value } Vinv^* = Va + sLaIinv^* \tag{5}$$

In expression (5), La is an inductance of the AC reactor, and s is the Laplace operator.

The above expression (5) is represented as follows, using a derivative with respect to time t.

$$Vinv^* = Va + La \times (dIinv^*/dt) \tag{5a}$$

The second terms on the right-hand side in expressions (5) and (5a) are values added in consideration of voltage generated between both ends of the AC reactor 22.

Thus, in the present example, the inverter output voltage command value Vinv* (voltage target value) is set based on the inverter current command value Iinv* which is the current target value for controlling the single-phase inverter circuit 11 so that current of AC power outputted from the single-phase inverter circuit 11 has the same phase as the system voltage detection value Va.

It is preferable that the inductance La in expression (5) is common among the AC reactors 22 for the three phases. By the setting of the inverter output voltage command value Vinv* as described above, since both the step-up circuit 10 and the single-phase inverter circuit 11 operate based on the current target value Iinv* set by the control unit 12, occurrence of phase-deviation or distortion in AC current outputted from each conversion device 1 can be suppressed even if operation is performed so as to alternately switch the high-frequency switching period between the two circuits.

After calculating the inverter output voltage command value Vinv*, the second calculation section 51 compares the DC input voltage detection value Vg with an absolute value of the inverter output voltage command value Vinv*, and determines the greater one to be step-up circuit voltage target value Vo* as shown by the following expression (6) (step S6).

$$\text{Step-up circuit voltage target value } Vo^* = \text{Max}(Vg, \text{absolute value of } Vinv^*) \tag{6}$$

Further, the second calculation section 51 calculates a step-up circuit current command value Iin* based on the following expression (7) (step S7).

$$\text{Step-up circuit current command value } Iin^* = \{(Iinv^* \times Vinv^*) + (sCVo^*) \times Vo^*\}/Vg \tag{7}$$

In expression (7), C is an electrostatic capacitance of the capacitor 19 (smoothing capacitor), and s is the Laplace operator.

The above expression (7) is represented as follows, using a derivative with respect to time t.

$$Iin^* = \{(Iinv^* \times Vinv^*) + C \times (dVo^*/dt) \times Vo^*\}/Vg \tag{7a}$$

If current flowing through the capacitor 19 is detected and the detected current is denoted by Ic, the following expression is obtained.

$$Iin^* = \{(Iinv^* \times Vinv^*) + Ic \times Vo^*\}/Vg \tag{7b}$$

In expressions (7), (7a), and (7b), a term added to an absolute value of a product of the inverter current command value Iinv* and the inverter output voltage command value Vinv* is a value added in consideration of reactive power passing through the capacitor 19. That is, consideration of the reactive power in addition to the power target value for the single-phase inverter circuit 11 allows for more accurate calculation of the value of Iin*.

Further, if power loss $P_{LOSS}$ of the power conversion device 1P is measured in advance, the above expression (7a) can be represented as follows.

$$Iin^* = \{(Iinv^* \times Vinv^*) + C \times (dVo^*/dt) \times Vo^* + P_{LOSS}\}/Vg \tag{7c}$$

Similarly, the above expression (7b) can be represented as follows.

$$Iin^* = \{(Iinv^* \times Vinv^*) + Ic \times Vo^* + P_{LOSS}\}/Vg \quad (7d)$$

In this case, consideration of the reactive power and the power loss $P_{LOSS}$ in addition to the power target value of the single-phase inverter circuit 11 allows for more strict calculation of the value of Iin*.

If the electrostatic capacitance C and the power loss $P_{LOSS}$ of the capacitor 19 are sufficiently smaller than (Iinv* × Vinv*), the following expression (8) is obtained. By using this expression (8), the calculation process can be simplified and the calculation time can be shortened.

$$\text{Step-up circuit current command value } Iin^* = (Iinv^* \times Vinv^*)/Vg \quad (8)$$

After calculating the step-up circuit current command value Iin*, the second calculation section 51 gives the step-up circuit current command value Iin* to the third adder 52.

The step-up circuit 10 is subjected to feedback control based on the step-up circuit current command value Iin*.

As well as the step-up circuit current command value Iin*, the present step-up circuit current detection value Iin is given to the third adder 52.

The third adder 52 calculates a difference between the step-up circuit current command value Iin* and the present step-up circuit current detection value Iin, and gives a result of the calculation to the compensator 53.

When the above difference is given, the compensator 53 calculates, based on a proportionality coefficient or the like, a step-up circuit voltage reference value Vbc# that allows the difference to converge so that the step-up circuit current detection value Iin becomes the step-up circuit current command value Iin*. The compensator 53 gives the step-up circuit voltage reference value Vbc# to the step-up circuit control unit 32, thereby causing the step-up circuit 10 to output power with voltage Vo according to the step-up circuit voltage reference value Vbc#.

The power outputted from the step-up circuit 10, from which the DC input voltage detection value Vg is subtracted by the fourth adder 54, is given to the DC reactor 15, and then fed back as a new step-up circuit current detection value Iin. Then, a difference between the step-up circuit current command value Iin* and the step-up circuit current detection value Iin is calculated again by the third adder 52, and the step-up circuit 10 is controlled based on the difference as described above.

As described above, the step-up circuit 10 is subjected to feedback control based on the step-up circuit current command value Iin* and the step-up circuit current detection value Iin (step S8).

After the above step S8, the control processing unit 30 calculates the present input power average value <Pin> based on the above expression (1) (step S9).

Based on comparison with the input power average value <Pin> that has been previously calculated, the control processing unit 30 sets the DC input current command value Ig* so that the input power average value <Pin> becomes a maximum value (follows the maximum power point).

Thus, the control processing unit 30 controls the step-up circuit 10 and the single-phase inverter circuit 11 while performing MPPT control for the photovoltaic panel 2.

As described above, the control processing unit 30 performs feedback control for the single-phase inverter circuit 11 and the step-up circuit 10 by the current command values.

Figure 8:
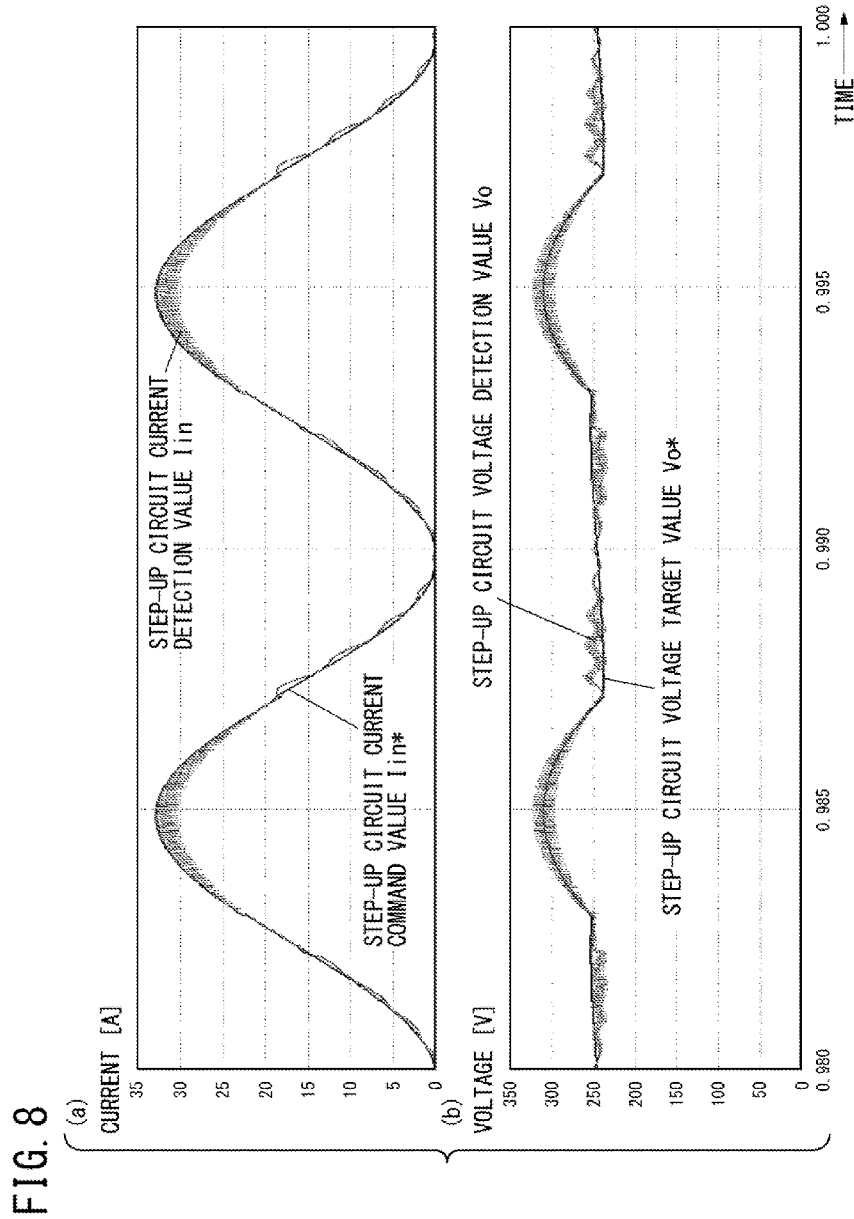
FIG. 8 is graphs in which (a) shows an example of a simulation result of a step-up circuit current command value calculated in a feedback control by the control processing unit, and a step-up circuit current detection value obtained when control is performed in accordance with the step-up circuit current command value, and (b) shows an example of a simulation result of a step-up circuit voltage target value calculated in the feedback control by the control processing unit, and a step-up circuit voltage detection value obtained when control is performed in accordance with the step-up circuit voltage target value.

FIG. 8 is graphs in which (a) shows an example of a simulation result of the step-up circuit current command value Iin* calculated in the above feedback control by the control processing unit 30, and the step-up circuit current detection value Iin obtained when control is performed in accordance with the step-up circuit current command value Iin*, and (b) shows an example of a simulation result of the step-up circuit voltage target value Vo* calculated in the above feedback control by the control processing unit 30, and step-up circuit voltage detection value Vo obtained when control is performed in accordance with the step-up circuit voltage target value Vo*.

As shown in (a) of FIG. 8, it is found that the step-up circuit current detection value Iin is controlled along the step-up circuit current command value Iin* by the control processing unit 30.

As shown in (b) of FIG. 8, since the step-up circuit voltage target value Vo* is calculated by the above expression (6), the step-up circuit voltage target value Vo* varies so as to follow an absolute value of the inverter output voltage command value Vinv* during a period in which the absolute value of the inverter output voltage command value Vinv* is generally equal to or greater than the DC input voltage detection value Vg, and follow the DC input voltage detection value Vg during the other period.

It is found that the step-up circuit voltage detection value Vo is controlled along the step-up circuit voltage target value Vo* by the control processing unit 30.

Figure 9:
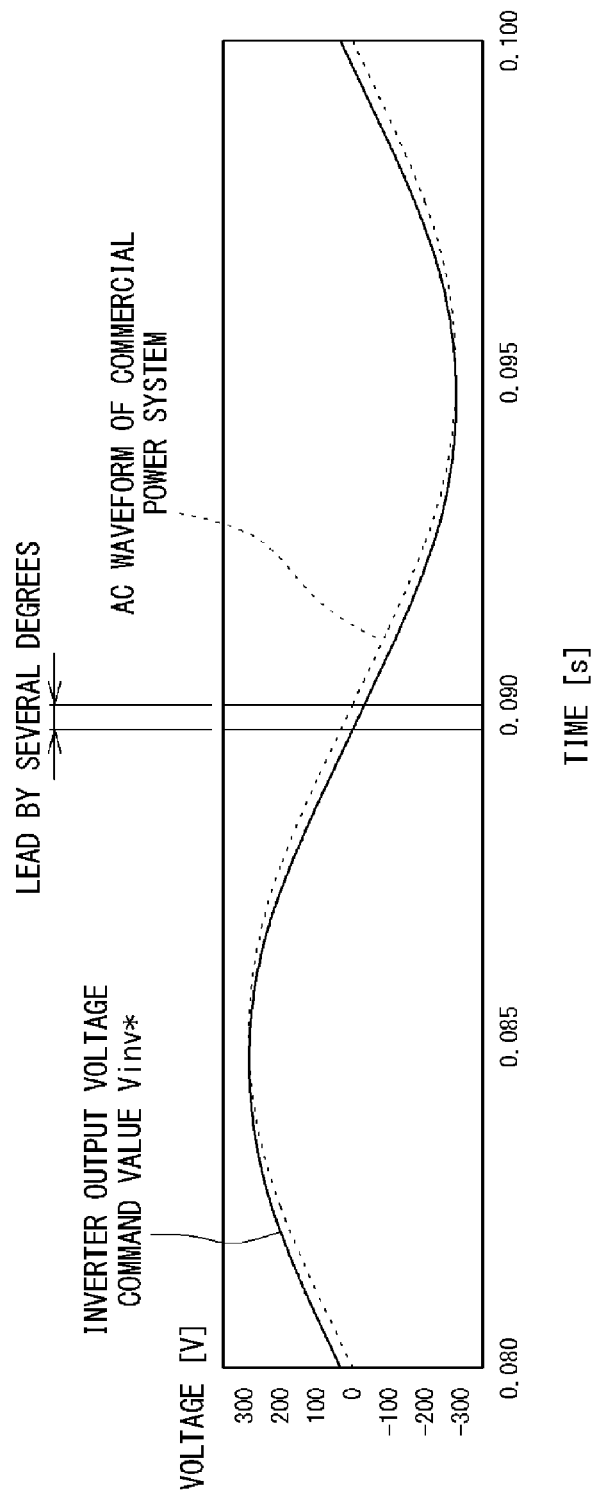
FIG. 9 is a diagram showing an example of an inverter output voltage command value.

FIG. 9 is a diagram showing an example of the inverter output voltage command value Vinv*. In FIG. 9, the vertical axis indicates voltage and the horizontal axis indicates time. A broken line indicates a voltage waveform of the system phase power supply 3p, and a solid line indicates a waveform of the inverter output voltage command value Vinv*.

The conversion device 1 outputs power, using the inverter output voltage command value Vinv* shown in FIG. 9 as a voltage target value, through the control according to the flowchart in FIG. 7.

Therefore, the conversion device 1 outputs power having voltage according to the waveform of the inverter output voltage command value Vinv* shown in FIG. 9.

As shown in FIG. 9, the two waveforms have almost the same voltage value and the same frequency, but the phase of the inverter output voltage command value Vinv* leads the phase of voltage of the system phase power supply 3p by several degrees.

The control processing unit 30 of the present example causes the phase of the inverter output voltage command value Vinv* to lead the phase of voltage of the system phase power supply 3p by about three degrees while executing the feedback control for the step-up circuit 10 and the single-phase inverter circuit 11, as described above.

The degree of angle by which the phase of the inverter output voltage command value Vinv* is caused to lead the phase of voltage of the system phase power supply 3p may be several degrees, and as described later, the degree of angle is set within such a range that the phase of a voltage waveform of a difference from a voltage waveform of the system phase power supply 3p leads the phase of the voltage waveform of the system phase power supply 3p by almost 90 degrees. For example, the degree of the phase leading angle is set to be greater than 0 degrees and smaller than 10 degrees.

The degree of the phase leading angle is determined by the system voltage detection value Va, the inductance La of the AC reactor 22, and the inverter current command value Iinv* as shown by the above expression (5). Of these values, the system voltage detection value Va and the inductance La of the AC reactor 22 are fixed values that are not control targets. Therefore, the degree of the phase leading angle is determined by the inverter current command value Iinv*.

The inverter current command value Iinv* is determined by the output current command value Ia* as shown by the above expression (4). As the output current command value Ia* increases, a phase leading component of the inverter current command value Iinv* increases, and a leading angle (phase leading angle) of the inverter output voltage command value Vinv* increases.

Since the output current command value Ia* is calculated by the above expression (2), the phase leading angle is adjusted by the DC input current command value Ig*.

The control processing unit 30 of the present example sets the DC input current command value Ig* so that the phase of the inverter output voltage command value Vinv* leads the phase of voltage of the system phase power supply 3p by about three degrees, as described above.

[1.2 Control for Step-Up Circuit and Single-Phase Inverter Circuit]

The step-up circuit control unit 32 controls the switching elements Qa and Qb of the step-up circuit 10. The inverter circuit control unit 33 controls the switching elements Q1 to Q4 of the single-phase inverter circuit 11.

The step-up circuit control unit 32 and the inverter circuit control unit 33 respectively generate a step-up circuit carrier wave and an inverter circuit carrier wave, and respectively modulate these carrier waves with the step-up circuit voltage reference value Vbc# and the inverter voltage reference value Vinv# which are command values given from the control processing unit 30, to generate drive waveforms for driving each switching element.

The step-up circuit control unit 32 and the inverter circuit control unit 33 control each switching element based on the drive waveforms, thereby causing the step-up circuit 10 and the single-phase inverter circuit 11 to output AC powers having current waveforms approximate to the step-up circuit current command value Iin* and the inverter current command value Iinv*, respectively.

Figure 10:
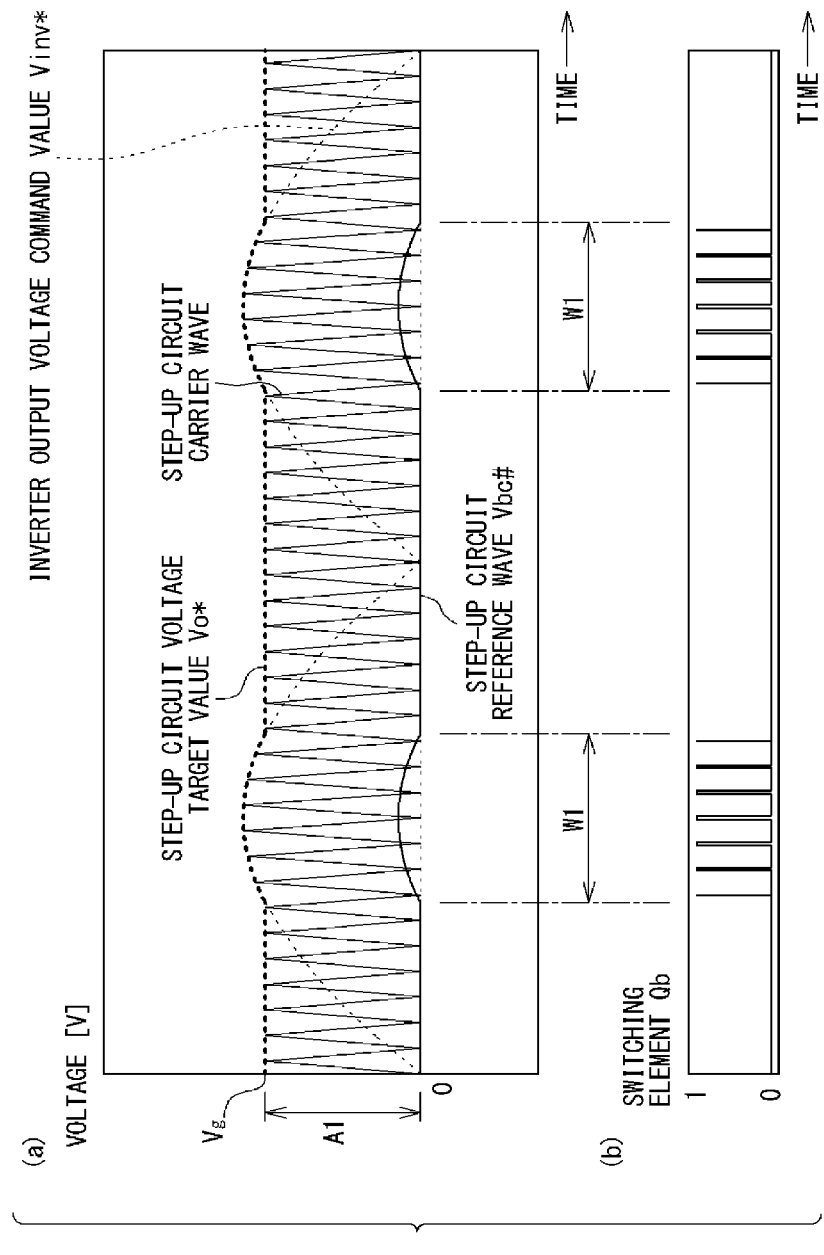
FIG. 10 is graphs in which (a) shows comparison between a step-up circuit carrier wave and a step-up circuit reference wave, and (b) shows a drive waveform for driving a switching element Qb, generated by a step-up circuit control unit.

In FIG. 10, (a) is a graph showing comparison between the step-up circuit carrier wave and a waveform of the step-up circuit voltage reference value Vbc#. In (a) of FIG. 10, the vertical axis indicates voltage and the horizontal axis indicates time. In (a) of FIG. 10, for facilitating the understanding, the wavelength of the step-up circuit carrier wave is elongated as compared to the actual wavelength.

The step-up circuit carrier wave generated by the step-up circuit control unit 32 is a triangle wave having a minimum value of "0", and has an amplitude A1 set at the step-up circuit voltage target value Vo* given from the control processing unit 30.

The frequency of the step-up circuit carrier wave is set by the step-up circuit control unit 32 in accordance with a control command from the control processing unit 30, so as to realize a predetermined duty ratio.

As described above, the step-up circuit voltage target value Vo* varies so as to follow an absolute value of the inverter output voltage command value Vinv* during a period W1 in which the absolute value of the inverter output voltage command value Vinv* is generally equal to or greater than the DC input voltage detection value Vg, and follow the DC input voltage detection value Vg during the other period. Therefore, the amplitude A1 of the step-up circuit carrier wave also varies in accordance with the step-up circuit voltage target value Vo*.

A waveform (hereinafter, may be referred to as a step-up circuit reference wave Vbc#) of the step-up circuit voltage reference value Vbc# corresponds to a value calculated based on the step-up circuit current command value Iin* by the control processing unit 30, and has a positive value during the period W1 in which the absolute value of the inverter output voltage command value Vinv* is greater than the DC input voltage detection value Vg. During the period W1, the step-up circuit reference wave Vbc# has a waveform approximate to the shape of a waveform created by the step-up circuit voltage target value Vo*, and crosses the step-up circuit carrier wave.

The step-up circuit control unit 32 compares the step-up circuit carrier wave with the step-up circuit reference wave Vbc#, and generates a drive waveform for driving the switching element Qb so as to be turned on during a period in which the step-up circuit reference wave Vbc# which is a target value for voltage between both ends of the DC reactor 15 is equal to or greater than the step-up circuit carrier wave, and to be turned off during a period in which the step-up circuit reference wave Vbc# is equal to or smaller than the carrier wave.

In FIG. 10, (b) shows the drive waveform for driving the switching element Qb, generated by the step-up circuit control unit 32. In (b) of FIG. 10, the vertical axis indicates voltage and the horizontal axis indicates time. The horizontal axis in (b) of FIG. 10 coincides with that in (a) of FIG. 10.

The drive waveform indicates switching operation of the switching element Qb. When the drive waveform is given to the switching element Qb, the switching element Qb is caused to perform switching operation in accordance with the drive waveform. The drive waveform forms a control command to turn off the switching element when the voltage is 0 volts and turn on the switching element when the voltage is a plus voltage.

The step-up circuit control unit 32 generates the drive waveform so that the switching operation is performed during the period W1 in which the absolute value of the inverter output voltage command value Vinv* is equal to or greater than the DC input voltage detection value Vg. Therefore, in a range in which the absolute value is equal to or smaller than the DC input voltage detection value Vg, the switching element Qb is controlled to stop the switching operation.

Each pulse width is determined by an intercept of the step-up circuit carrier wave which is a triangle wave. Therefore, the pulse width is greater at a part where voltage is higher.

As described above, the step-up circuit control unit 32 modulates the step-up circuit carrier wave with the step-up circuit reference wave Vbc#, to generate the drive waveform representing pulse widths for switching. The step-up circuit control unit 32 performs PWM control for the switching element Qb of the step-up circuit 10, based on the generated drive waveform.

A drive waveform inverted from the drive waveform for the switching element Qb is used for the switching element Qa. In order to prevent the switching element Qb and the switching element Qa from conducting currents at the same time, a dead time of about 1 microsecond is provided at a part where a drive pulse for the switching element Qa shifts from OFF to ON.

Figure 11:
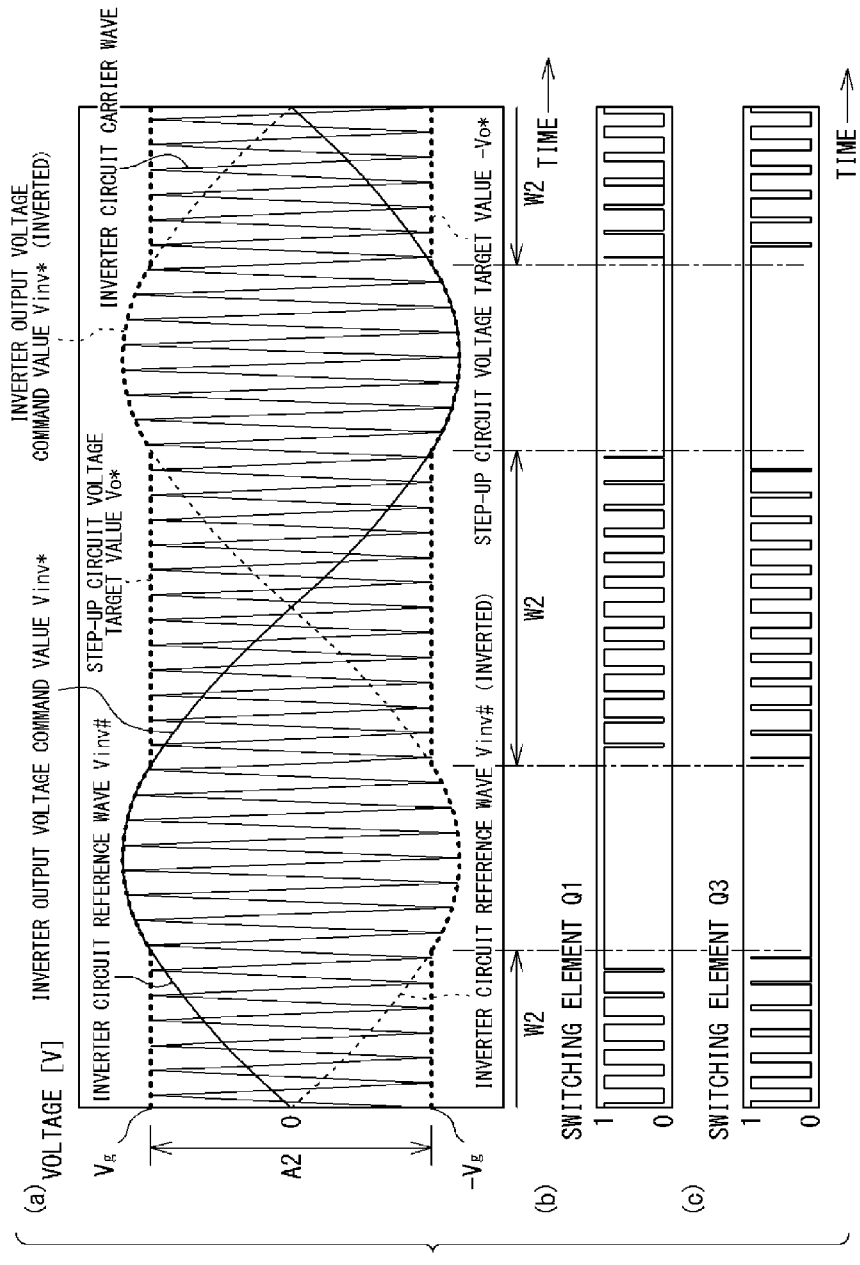
FIG. 11 is graphs in which (a) shows comparison between an inverter circuit carrier wave and an inverter circuit reference wave, (b) shows a drive waveform for driving a switching element Q1, generated by an inverter circuit control unit, and (c) shows a drive waveform for driving a switching element Q3, generated by the inverter circuit control unit.

In FIG. 11, (a) is a graph showing comparison between the inverter circuit carrier wave and a waveform of the inverter voltage reference value Vinv#. In (a) of FIG. 11, the vertical axis indicates voltage and the horizontal axis indicates time. Also in (a) of FIG. 11, for facilitating the understanding, the wavelength of the inverter circuit carrier wave is elongated as compared to the actual wavelength.

The inverter circuit carrier wave generated by the inverter circuit control unit 33 is a triangle wave having an amplitude center at 0 volts, and a one-side amplitude thereof is set at the step-up circuit voltage target value Vo* (a voltage target value for the capacitor 23). Therefore, the inverter circuit carrier wave has a period in which an amplitude A2 thereof is twice as great as the DC input voltage detection value Vg and a period in which the amplitude A2 is twice as great as voltage of the system phase power supply 3p.

The frequency thereof is set by the inverter circuit control unit 33 in accordance with a control command from the control processing unit 30, or the like, so as to realize a predetermined duty ratio.

As described above, the step-up circuit voltage target value Vo* varies to follow an absolute value of the inverter output voltage command value Vinv* during the period W1 in which the absolute value of the inverter output voltage command value Vinv* is generally equal to or greater than the DC input voltage detection value Vg, and follow the DC input voltage detection value Vg during the other period, i.e., a period W2. Therefore, the amplitude A2 of the inverter circuit carrier wave also varies in accordance with the step-up circuit voltage target value Vo*.

A waveform (hereinafter, may be referred to as an inverter circuit reference wave Vinv#) of the inverter voltage reference value Vinv# corresponds to a value calculated based on the inverter current command value Iinv* by the control processing unit 30, and is set to have generally the same amplitude as the voltage amplitude of the system phase power supply 3p. Therefore, the inverter circuit reference wave Vinv# crosses the inverter circuit carrier wave in a range where the voltage value is between −Vg and +Vg.

The inverter circuit control unit 33 compares the inverter circuit carrier wave with the inverter circuit reference wave Vinv#, and generates drive waveforms for driving the switching elements Q1 to Q4 so as to be turned on during a period in which the inverter circuit reference wave Vinv# which is a voltage target value is equal to or greater than the inverter circuit carrier wave, and to be turned off during a period in which the inverter circuit reference wave Vinv# is equal to or smaller than the carrier wave.

In FIG. 11, (b) shows the drive waveform for driving the switching element Q1, generated by the inverter circuit control unit 33. In (b) of FIG. 11, the vertical axis indicates voltage and the horizontal axis indicates time. The horizontal axis in (b) of FIG. 11 coincides with that in (a) of FIG. 11.

The inverter circuit control unit 33 generates the drive waveform so that the switching operation is performed in the range W2 in which voltage of the inverter circuit reference wave Vinv# is between −Vg and +Vg. Therefore, in the other range, the switching element Q1 is controlled to stop the switching operation.

In FIG. 11, (c) shows the drive waveform for driving the switching element Q3, generated by the inverter circuit control unit 33. In (c) of FIG. 11, the vertical axis indicates voltage and the horizontal axis indicates time.

The inverter circuit control unit 33 compares the carrier wave with a waveform indicated by a broken line in (a) of FIG. 11, which is inverted from the inverter circuit reference wave Vinv#, to generate the drive waveform for the switching element Q3.

Also in this case, the inverter circuit control unit 33 generates the drive waveform so that the switching operation is performed in the range W2 in which voltage of (a waveform inverted from) the inverter circuit reference wave Vinv# is between −Vg and +Vg. Therefore, in the other range, the switching element Q3 is controlled to stop the switching operation.

The inverter circuit control unit 33 generates, as the drive waveform for the switching element Q2, a waveform inverted from the drive waveform for the switching element Q1, and generates, as the drive waveform for the switching element Q4, a waveform inverted from the drive waveform for the switching element Q3.

As described above, the inverter circuit control unit 33 modulates the inverter circuit carrier wave with the inverter circuit reference wave Vinv#, to generate the drive waveforms representing pulse widths for switching. The inverter circuit control unit 33 performs PWM control for the switching elements Q1 to Q4 of the single-phase inverter circuit 11, based on the generated drive waveforms.

The step-up circuit control unit 32 of the present example causes the step-up circuit 10 to output power so that current flowing in the DC reactor 15 coincides with the step-up circuit current command value Iin*. As a result, the step-up circuit 10 is caused to perform switching operation during the period W1 (FIG. 10) in which an absolute value of the inverter output voltage command value Vinv* is generally equal to or greater than the DC input voltage detection value Vg. The step-up circuit 10 outputs power having voltage equal to or greater than the DC input voltage detection value Vg and approximate to the absolute value of the inverter output voltage command value Vinv*, during the period W1. On the other hand, during the period in which the absolute value of the inverter output voltage command value Vinv* is generally equal to or smaller than the DC input voltage detection value Vg, the step-up circuit control unit 32 stops the switching operation of the step-up circuit 10. Therefore, during the period in which the absolute value is equal to or smaller than the DC input voltage detection value Vg, the step-up circuit 10 outputs, to the single-phase inverter circuit 11, DC power outputted from the photovoltaic panel 2 without stepping up the voltage of the DC power.

The inverter circuit control unit 33 of the present example causes the single-phase inverter circuit 11 to output power so that current flowing in the AC reactor 22 coincides with the inverter current command value Iinv*. As a result, the single-phase inverter circuit 11 is caused to perform switching operation during the period W2 (FIG. 11) in which the inverter output voltage command value Vinv* is generally between −Vg and +Vg. That is, the single-phase inverter circuit 11 is caused to perform switching operation during a period in which an absolute value of the inverter output voltage command value Vinv* is equal to or smaller than the DC input voltage detection value Vg.

Therefore, while switching operation of the step-up circuit 10 is stopped, the single-phase inverter circuit 11 performs switching operation to output AC power approximate to the inverter output voltage command value Vinv*.

Since the inverter circuit reference wave Vinv# and the inverter output voltage command value Vinv* are approximate to each other, they overlap each other in (a) of FIG. 11.

On the other hand, in the period other than the period W2 in which voltage of the inverter output voltage command value Vinv* is generally between −Vg and +Vg, the inverter circuit control unit 33 stops the switching operation of the single-phase inverter circuit 11. During this period, power stepped up by the step-up circuit 10 is given to the single-phase inverter circuit 11. Therefore, the single-phase inverter circuit 11 whose switching operation is stopped outputs the power given from the step-up circuit 10, without stepping down the voltage thereof.

That is, the conversion device 1 of the present example causes the step-up circuit 10 and the single-phase inverter circuit 11 to perform switching operations so as to be alternately switched therebetween, and superimposes their respective output powers on each other, thereby outputting AC power having a voltage waveform approximate to the inverter output voltage command value Vinv*.

Thus, in the present example, control is performed so that the step-up circuit 10 is operated in a case of outputting voltage corresponding to the part where the absolute value of the inverter output voltage command value Vinv* is higher than the DC input voltage detection value Vg, and the single-phase inverter circuit 11 is operated in a case of outputting voltage corresponding to the part where the absolute value of the inverter output voltage command value Vinv* is lower than the DC input voltage detection value Vg. Therefore, since the single-phase inverter circuit 11 does not step down the power that has been stepped up by the step-up circuit 10, a potential difference in stepping down of the voltage can be reduced, whereby loss due to switching of the step-up circuit is reduced and AC power can be outputted with increased efficiency.

Further, since both the step-up circuit 10 and the single-phase inverter circuit 11 operate based on the inverter output voltage command value Vinv* (voltage target value) set by the control unit 12, occurrence of deviation or distortion between power of the step-up circuit and power of the single-phase inverter circuit which are outputted so as to be alternately switched can be suppressed.

Figure 12:
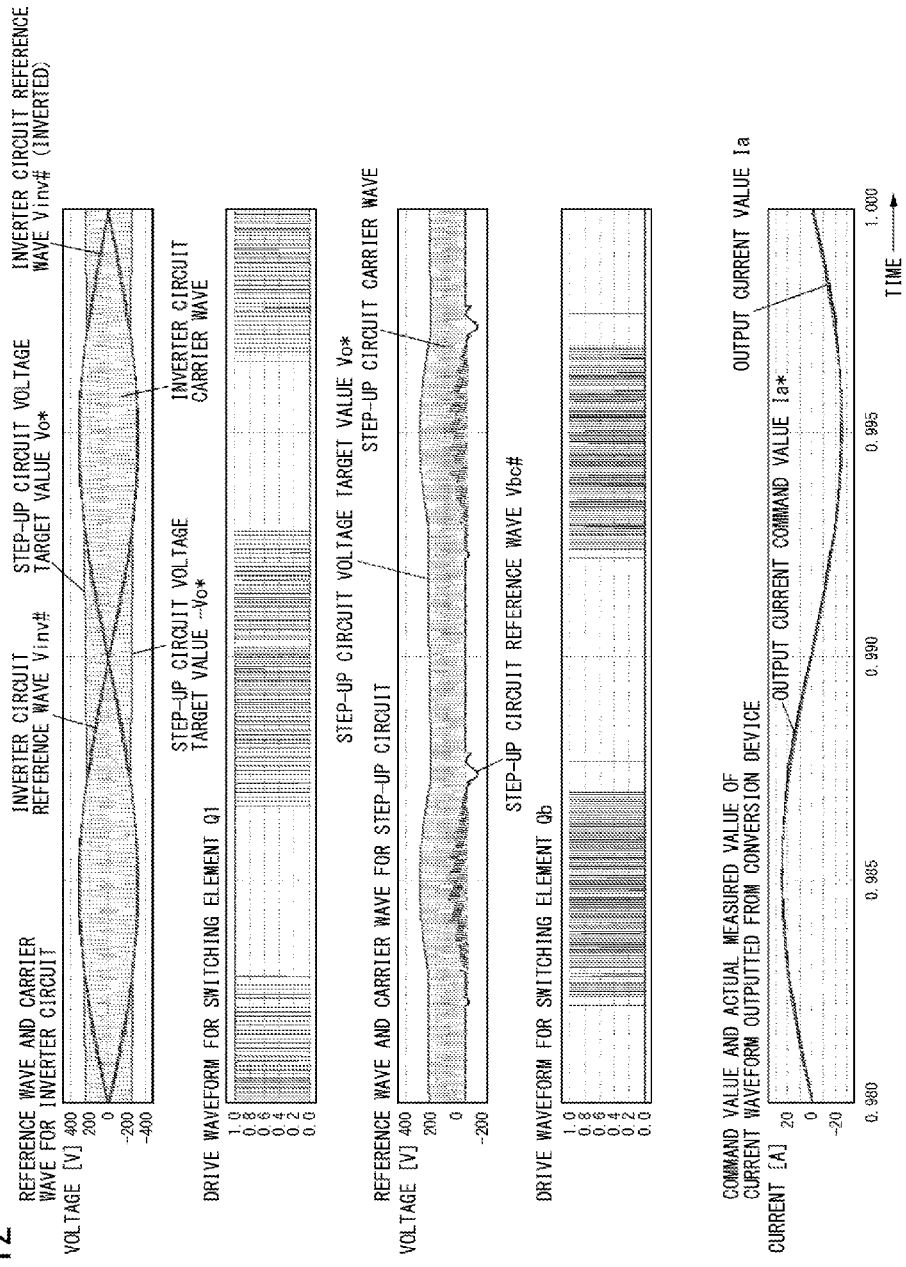
FIG. 12 is a diagram showing examples of reference waves and drive waveforms for switching elements, and an example of a current waveform of AC power outputted from the conversion device.

FIG. 12 is a diagram showing examples of the reference waves and the drive waveforms for the switching elements, and an example of a current waveform of AC power outputted from the conversion device 1.

FIG. 12 shows graphs of, from the uppermost side, the reference wave Vinv# and the carrier wave for the single-phase inverter circuit, the drive waveform for the switching element Q1, the reference wave Vbc# and the carrier wave for the step-up circuit, the drive waveform for the switching element Qb, and the command value and an actual measured value of a current waveform of AC power outputted from the conversion device 1. The horizontal axes of these graphs indicate time, and coincide with each other.

As shown in FIG. 12, it is found that output current is controlled so that an actual measured value Ia thereof coincides with the command value Ia*.

In addition, it is found that the period in which the switching element Qb of the step-up circuit 10 performs switching operation and the period in which the switching elements Q1 to Q4 of the single-phase inverter circuit 11 perform switching operations are controlled so as to be generally alternately switched therebetween.

In the present example, as shown in (a) of FIG. 8, the step-up circuit is controlled so that current flowing in the DC reactor 15 coincides with the current command value Iin* calculated based on the above expression (7). As a result, voltages of the step-up circuit and the single-phase inverter circuit have waveforms as shown in (b) of FIG. 8, and it becomes possible to perform such an operation that high-frequency switching operations of the step-up circuit 10 and the single-phase inverter circuit 11 have respective stop periods and the switching operations are performed generally alternately.

[1.3 Current Phase of Outputted AC Power]

The step-up circuit 10 and the single-phase inverter circuit 11 of the present example output AC power having a voltage waveform approximate to the inverter output voltage command value Vinv*, to the filter circuit 21 connected at the subsequent stage, through the control by the control unit 12. The conversion device 1 outputs AC power to the system phase power supply 3p via the filter circuit 21.

Here, the inverter output voltage command value Vinv* is generated by the control processing unit 30 so as to have a voltage phase leading the voltage phase of the system phase power supply 3p by several degrees as described above.

Therefore, AC voltage outputted by the step-up circuit 10 and the single-phase inverter circuit 11 also has a voltage phase leading the voltage phase of the system phase power supply 3p by several degrees.

As a result, the AC voltage from the step-up circuit 10 and the single-phase inverter circuit 11 is applied to one end of the AC reactor 22 (FIG. 2) of the filter circuit 21, and voltage of the system phase power supply 3p is applied to the other end. Thus, voltages having phases shifted from each other by several degrees are applied to the respective ends of the AC reactor 22.

Figure 13:
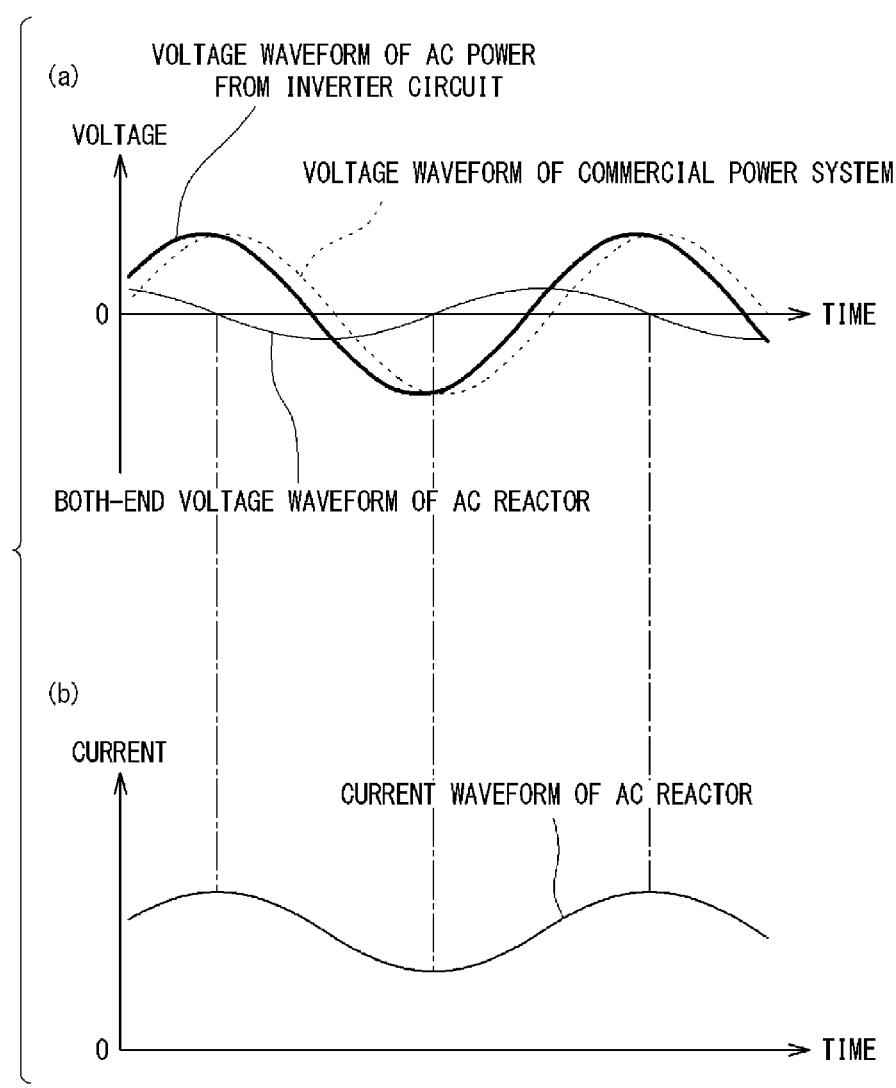
FIG. 13 is graphs in which (a) shows voltage waveforms of AC voltage outputted from the single-phase inverter circuit, a system phase power supply, and voltage between both ends of an AC reactor, and (b) shows a waveform of current flowing in the AC reactor.

In FIG. 13, (a) is a graph showing voltage waveforms of AC voltage outputted from the single-phase inverter circuit 11, the system phase power supply 3p, and voltage between both ends of the AC reactor 22. In (a) of FIG. 13, the vertical axis indicates voltage and the horizontal axis indicates time.

As shown in (a) of FIG. 13, when voltages having phases shifted from each other by several degrees are applied to the respective ends of the AC reactor 22, the voltage between both ends of the AC reactor 22 is equal to a difference between the voltages applied to the respective ends of the AC reactor 22 and having phases shifted from each other by several degrees.

Therefore, as shown in (a) of FIG. 13, the phase of voltage between both ends of the AC reactor 22 leads the phase of voltage of the system phase power supply 3p by 90 degrees.

In FIG. 13, (b) is a graph showing a waveform of current flowing in the AC reactor 22. In (b) of FIG. 13, the vertical axis indicates current and the horizontal axis indicates time. The horizontal axis in (b) of FIG. 13 coincides with that in (a) of FIG. 13.

The current phase of the AC reactor 22 lags the voltage phase thereof by 90 degrees. Therefore, as shown in (b) of FIG. 13, the current phase of AC power outputted through the AC reactor 22 is synchronized with the phase of the phase voltage of the system phase power supply 3p.

Therefore, although the phase of voltage outputted from the single-phase inverter circuit 11 leads the phase of the system phase power supply 3p by several degrees, the phase of current outputted from the single-phase inverter circuit 11 coincides with the phase of the phase voltage of the system phase power supply 3p.

Therefore, as shown in the lowermost graph in FIG. 12, the phase of a current waveform outputted from the conversion device 1 coincides with the voltage phase of the system phase power supply 3p.

As a result, AC current in phase with voltage of the system phase power supply 3p can be outputted, whereby reduction in a power factor of the AC power can be suppressed.

<<Example of Combination with Photovoltaic Panels>>

Figure 22:
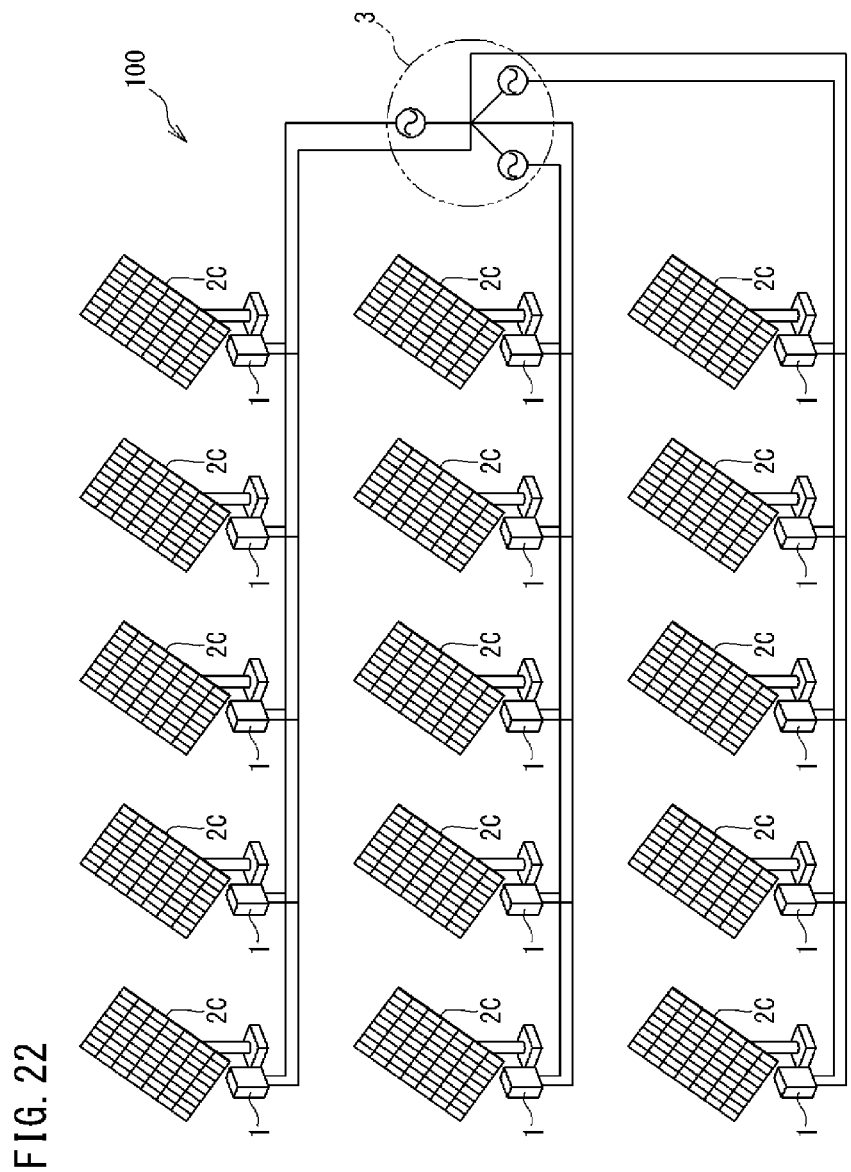
FIG. 22 is a schematic connection diagram showing a three-phase AC power supply device using a concentrator photovoltaic panel.
Figure 23:
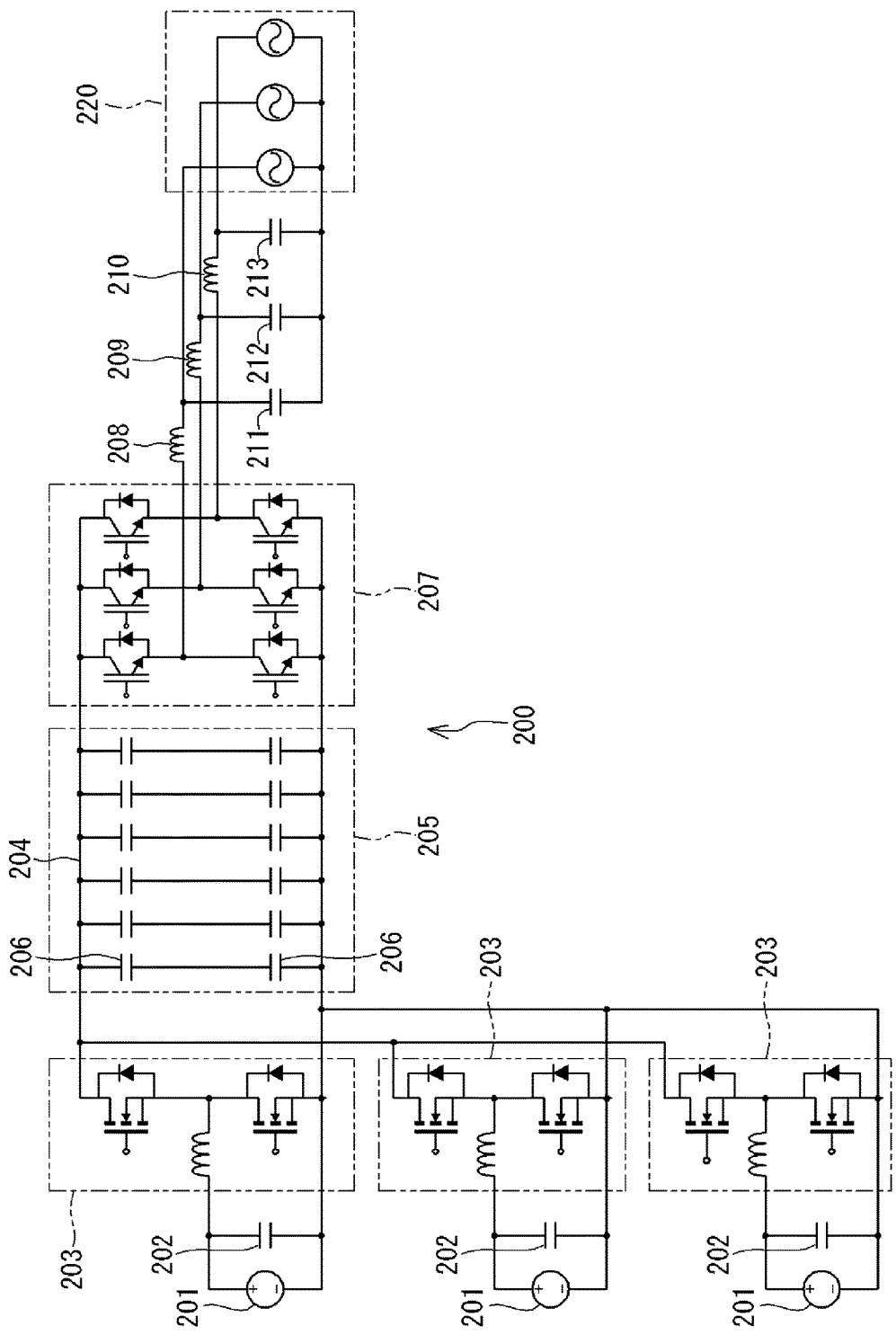
FIG. 23 is an example of a circuit diagram of a conventional power conversion device used in a case of performing system interconnection from a DC power supply to a three-phase AC system.

FIG. 22 is a schematic connection diagram showing the three-phase AC power supply device 100 using, for example, five concentrator photovoltaic (CPV) panels 2C for each phase, i.e., fifteen concentrator photovoltaic panels 2C in total. Each concentrator photovoltaic panel 2C has an optical system such as multiple Fresnel lenses arranged in matrix, to concentrate sunlight on the corresponding solar battery cell and generate power. In addition, each concentrator photovoltaic panel 2C has a tracking drive device (not shown) on the back side, and thus the concentrator photovoltaic panel 2C is configured to be always directed toward the sun during the day.

Each concentrator photovoltaic panel 2C is provided with the conversion device 1 (power conditioner). If outputs of the conversion devices 1 are connected in parallel in each phase to obtain large output of power generation and achieve system interconnection with the three-phase AC system 3, a photovoltaic power station can be obtained. Such a power station can perform comparatively stable power generation with high output during the day while suppressing power loss.

<<Others>>

In the embodiment of the three-phase AC power supply device 100 described above, an example in which a photovoltaic panel is used as the DC power supply has been shown. However, the DC power supply is not limited thereto. For example, as the DC power supply, a storage battery may be used or photovoltaic generation and a storage battery may be used in combination. In a case of combining a storage battery, the storage battery may be charged with output of the photovoltaic panel, and the three-phase AC system may be supplied with power from the photovoltaic panel during the day and from the storage battery during the night.

In the conversion devices 1 (power conversion device 1P), if storage batteries are used instead of the photovoltaic panels 2, it is also possible to receive power from the three-phase AC system 3 and output DC powers to the first DC power supply, the second DC power supply, and the third DC power supply. That is, if the phase of the current target value (Iinv*) and the phase of the voltage target value (Vinv*) for the single-phase inverter circuit 11 are shifted from each other by 180 degrees, it is also possible to perform output in a reverse direction from the three-phase AC system 3 to each DC power supply, through the same control of the current target value (Iin*).

It has been verified that the same result as in each simulation in the above embodiments can be obtained using an actual machine.

It is noted that the embodiments disclosed herein are merely illustrative in all aspects and should not be recognized as being restrictive. The scope of the present invention is defined by the scope of the claims and is intended to include meaning equivalent to the scope of the claims and all modifications within the scope.

REFERENCE SIGNS LIST 1 conversion device
1P power conversion device
2 photovoltaic panel (DC power supply)
2C concentrator photovoltaic panel
3 three-phase AC system
3p system phase power supply
10 step-up circuit
11 single-phase inverter circuit
12 control unit
15 DC reactor
17 first voltage sensor
18 first current sensor
19 capacitor
21 filter circuit
22 AC reactor
23 capacitor
24 second current sensor
25 second voltage sensor
26 capacitor
30 control processing unit
32 circuit control unit
33 circuit control unit
34 averaging processing unit
41 first calculation section
42 first adder
43 compensator
44 second adder
51 second calculation section
52 third adder
53 compensator
54 fourth adder
100 three-phase AC power supply device
200 power conversion device
201 photovoltaic panel
202 capacitor
203 step-up circuit
204 DC bus
205 smoothing circuit
206 capacitor
207 three-phase inverter circuit
208 to 210 AC reactor
211 to 213 capacitor
220 three-phase AC system
$L_B$ DC bus
$L_{in}$ electric path
Q1 to Q4, Qa, Qb switching element

The invention claimed is:

1. A power conversion device for converting DC powers to AC powers to be supplied to a three-phase AC system, the DC powers being inputted from a first DC power supply, a second DC power supply, and a third DC power supply which are independent of each other without sharing either a positive terminal or a negative terminal, the power conversion device comprising:

a first-phase conversion device configured to, based on the DC power inputted from the first DC power supply, supply the AC power to a first phase with respect to a neutral point of the three-phase AC system via a first reactor;

a second-phase conversion device configured to, based on the DC power inputted from the second DC power supply, supply the AC power to a second phase with respect to the neutral point of the three-phase AC system via a second reactor;

a third-phase conversion device configured to, based on the DC power inputted from the third DC power supply, supply the AC power to a third phase with respect to the neutral point of the three-phase AC system via a third reactor; and a control unit configured to control the first-phase conversion device, the second-phase conversion device, and the third-phase conversion device, wherein the first-phase conversion device, the second-phase conversion device, and the third-phase conversion device each include a step-up circuit for stepping up a DC input voltage value of the DC power, and a single-phase inverter circuit, and for each of the first-phase conversion device, the second-phase conversion device, and the third-phase conversion device, when an absolute value of a voltage target value obtained, as an AC waveform to be outputted, by superimposing a third-order harmonic on a fundamental wave exceeds the DC input voltage value, the control unit causes the step-up circuit to perform step-up operation to generate the absolute value of the voltage target value and causes the single-phase inverter circuit to only perform necessary polarity inversion, and when the absolute value of the voltage target value is smaller than the DC input voltage value, the control unit stops the step-up operation of the step-up circuit and causes the single-phase inverter circuit to operate to generate the voltage target value, the voltage target value being set by adding a voltage appearing between both ends of each of the first reactor, the second reactor and the third reactor to a voltage value of each phase of the three-phase AC system.

2. The power conversion device according to claim 1, wherein
the control unit
calculates an output current target value based on an input power value of the DC power and a voltage value of each phase of the three-phase AC system, and calculates a current target value and a voltage target value for the single-phase inverter circuit based on the output current target value, to control the single-phase inverter circuit, and
calculates a current target value for the step-up circuit based on a current target value and a voltage target value that are common with the single-phase inverter circuit, and on the DC input voltage value, to control the step-up circuit, and
thereby controls output of the AC power.

3. The power conversion device according to claim 2, wherein
a smoothing capacitor is provided between the step-up circuit and the single-phase inverter circuit, and
the current target value for the step-up circuit is calculated based on the DC input voltage value and on a value obtained by adding reactive power passing through the smoothing capacitor to a power target value that is based on the current target value and the voltage target value for the single-phase inverter circuit.

4. The power conversion device according to claim 2, wherein
a smoothing capacitor is provided between the step-up circuit and the single-phase inverter circuit, and
the current target value for the step-up circuit is calculated based on the DC input voltage value and on a value obtained by adding reactive power passing through the smoothing capacitor and power loss in the power conversion device to a power target value that is based on the current target value and the voltage target value for the single-phase inverter circuit.

5. The power conversion device according to claim 2, wherein
an output smoothing capacitor is provided at a stage subsequent to each of the first reactor, the second reactor, and the third reactor, and
in a case where the output current target value is Ia*, the current target value for the step-up circuit is Iin*, the current target value and the voltage target value for the single-phase inverter circuit are Iinv* and Vinv*, respectively, an electrostatic capacitance of the output smoothing capacitor is Ca, the voltage value of each phase of the three-phase AC system is Va, and the DC input voltage value is Vg, the following expressions are satisfied:

$$Iin^* = (Iinv^* \times Vinv^*)/Vg$$

$$Iinv^* = Ia^* + Ca \times (d\, Va/dt).$$

6. The power conversion device according to claim 2, wherein
an output smoothing capacitor is provided at a stage subsequent to each of the first reactor, the second reactor, and the third reactor, and
in a case where the output current target value is Ia*, the current target value for the step-up circuit is Iin*, the current target value and the voltage target value for the single-phase inverter circuit are Iinv* and Vinv*, respectively, the voltage value of each phase of the three-phase AC system is Va, the DC input voltage value is Vg, and current flowing through the output smoothing capacitor is Ica, the following expressions are satisfied:

$$Iin^* = (Iinv^* \times Vinv^*)/Vg$$

$$Iinv^* = Ia^* + Ica.$$

7. The power conversion device according to claim 3, wherein
in a case where the current target value for the step-up circuit is Iin*, the current target value and the voltage target value for the single-phase inverter circuit are Iinv* and Vinv*, respectively, an electrostatic capacitance of the smoothing capacitor is C, a voltage target value for the step-up circuit is Vo*, and the DC input voltage value is Vg, the following expression is satisfied:

$$Iin^* = \{(Iinv^* \times Vinv^*) + C \times (d\, Vo^*/dt) \times Vo^*\}/Vg.$$

8. The power conversion device according to claim 3, wherein
in a case where the current target value for the step-up circuit is Iin*, the current target value and the voltage target value for the single-phase inverter circuit are Iinv* and Vinv*, respectively, a voltage target value for the step-up circuit is Vo*, the DC input voltage value is Vg, and current flowing through the smoothing capacitor is Ic, the following expression is satisfied:

$$Iin^* = \{(Iinv^* \times Vinv^*) + Ic \times Vo^*\}/Vg.$$

9. The power conversion device according to claim 4, wherein
in a case where the current target value for the step-up circuit is Iin*, the current target value and the voltage target value for the single-phase inverter circuit are Iinv* and Vinv*, respectively, an electrostatic capacitance of the smoothing capacitor is C, a voltage target value for the step-up circuit is Vo*, the DC input voltage value is Vg, and power loss in the power conversion device is $P_{LOSS}$, the following expression is satisfied:

$$Iin^* = \{(Iinv^* \times Vinv^*) + C \times (dVo^*/dt) \times Vo^* + P_{Loss}\}/Vg.$$

10. The power conversion device according to claim 4, wherein
in a case where the current target value for the step-up circuit is Iin*, the current target value and the voltage target value for the single-phase inverter circuit are Iinv* and Vinv*, respectively, a voltage target value for the step-up circuit is Vo*, the DC input voltage value is Vg, current flowing through the smoothing capacitor is Ic, and power loss in the power conversion device is $P_{LOSS}$, the following expression is satisfied:

$$Iin^* = \{(Iinv^* \times Vinv^*) + Ic \times Vo^* + P_{Loss}\}/Vg.$$

11. The power conversion device according to claim 5, wherein the control unit calculates the voltage target value Vinv* for the single-phase inverter circuit as the voltage target value for the step-up circuit by the following expression:

$$Vinv^* = Va + La(d\ Iinv^*/dt),$$

where La is an inductance that is common among the first reactor, the second reactor, and the third reactor.

12. The power conversion device according to claim 1, wherein power is received from the three-phase AC system and DC power is outputted to the first DC power supply, the second DC power supply, and the third DC power supply.

13. A three-phase AC power supply device connected to a three-phase AC system, the three-phase AC power supply device comprising:

a first DC power supply, a second DC power supply, and a third DC power supply which are independent of each other without sharing either a positive terminal or a negative terminal;

a first-phase conversion device configured to, based on DC power inputted from the first DC power supply, supply AC power to a first phase with respect to a neutral point of the three-phase AC system via a first reactor;

a second-phase conversion device configured to, based on DC power inputted from the second DC power supply, supply AC power to a second phase with respect to the neutral point of the three-phase AC system via a second reactor;

a third-phase conversion device configured to, based on DC power inputted from the third DC power supply, supply AC power to a third phase with respect to the neutral point of the three-phase AC system via a third reactor; and a control unit configured to control the first-phase conversion device, the second-phase conversion device, and the third-phase conversion device, wherein the first-phase conversion device, the second-phase conversion device, and the third-phase conversion device each include a step-up circuit for stepping up a DC input voltage value of the DC power, and a single-phase inverter circuit, and for each of the first-phase conversion device, the second-phase conversion device, and the third-phase conversion device, when an absolute value of a voltage target value obtained, as an AC waveform to be outputted, by superimposing a third-order harmonic on a fundamental wave exceeds the DC input voltage value, the control unit causes the step-up circuit to perform step-up operation to generate the absolute value of the voltage target value and causes the single-phase inverter circuit to only perform necessary polarity inversion, and when the absolute value of the voltage target value is smaller than the DC input voltage value, the control unit stops the step-up operation of the step-up circuit and causes the single-phase inverter circuit to operate to generate the voltage target value, the voltage target value being set by adding a voltage appearing between both ends of each of the first reactor, the second reactor and the third reactor to a voltage value of each phase of the three-phase AC system.

14. The three-phase AC power supply device according to claim 13, wherein each of the first DC power supply, the second DC power supply, and the third DC power supply is a concentrator photovoltaic panel configured to operate so as to track the sun.

15. The power conversion device according to claim 6, wherein the control unit calculates the voltage target value Vinv* for the single-phase inverter circuit as the voltage target value for the step-up circuit by the following expression:

$$Vinv^* = Va + La(d\ Iinv^*/dt),$$

where La is an inductance that is common among the first reactor, the second reactor, and the third reactor.

16. The power conversion device according to claim 7, wherein the control unit calculates the voltage target value Vinv* for the single-phase inverter circuit as the voltage target value for the step-up circuit by the following expression:

$$Vinv^* = Va + La(d\ Iinv^*/dt),$$

where La is an inductance that is common among the first reactor, the second reactor, and the third reactor, and Va is the voltage value of each phase of the three-phase AC system.

17. The power conversion device according to claim 8, wherein the control unit calculates the voltage target value Vinv* for the single-phase inverter circuit as the voltage target value for the step-up circuit by the following expression:

$$Vinv^* = Va + La(d\ Iinv^*/dt),$$

where La is an inductance that is common among the first reactor, the second reactor, and the third reactor, and Va is the voltage value of each phase of the three-phase AC system.

18. The power conversion device according to claim 9, wherein the control unit calculates the voltage target value Vinv* for the single-phase inverter circuit as the voltage target value for the step-up circuit by the following expression:

$$Vinv^* = Va + La(d\ Iinv^*/dt),$$

where La is an inductance that is common among the first reactor, the second reactor, and the third reactor, and Va is the voltage value of each phase of the three-phase AC system.

19. The power conversion device according to claim 10, wherein the control unit calculates the voltage target value Vinv* for the single-phase inverter circuit as the voltage target value for the step-up circuit by the following expression:

$$Vinv^* = Va + La(d\ Iinv^*/dt),$$

where La is an inductance that is common among the first reactor, the second reactor, and the third reactor, and Va is the voltage value of each phase of the three-phase AC system.

* * * * *